(12) United States Patent
Diaconescu et al.

(10) Patent No.: US 8,706,477 B1
(45) Date of Patent: Apr. 22, 2014

(54) SYSTEMS AND METHODS FOR LEXICAL CORRESPONDENCE LINGUISTIC KNOWLEDGE BASE CREATION COMPRISING DEPENDENCY TREES WITH PROCEDURAL NODES DENOTING EXECUTE CODE

(75) Inventors: Stefan Stelian Diaconescu, Bucharest (RO); Ionut Mihai Dumitrascu, Bucharest (RO); Felicia Carmen Codiriasu, Bucharest (RO); Oana-Adriana Bulibasa, Bucharest (RO)

(73) Assignee: Softwin SRL Romania, Bucharest (RO)

( * ) Notice: Subject to any disclaimer, the term of this patent is extended or adjusted under 35 U.S.C. 154(b) by 1269 days.

(21) Appl. No.: 12/109,885

(22) Filed: Apr. 25, 2008

(51) Int. Cl.
| G06F 17/27 | (2006.01) |
| G06F 17/20 | (2006.01) |
| G06F 17/28 | (2006.01) |
| G06F 9/44 | (2006.01) |

(52) U.S. Cl.
CPC .......... G06F 17/2785 (2013.01); G06F 9/4448 (2013.01); G06F 17/289 (2013.01); G06F 17/2872 (2013.01)
USPC ................. 704/9; 704/2; 704/3; 704/4; 704/8

(58) Field of Classification Search
CPC . G06F 17/2785; G06F 9/4448; G06F 17/289; G06F 17/2872
USPC .................................................. 704/2, 277, 8
See application file for complete search history.

(56) References Cited

U.S. PATENT DOCUMENTS

| 4,586,160 A | 4/1986 | Amano |
| 4,594,686 A | 6/1986 | Yoshida |
| 4,641,264 A | 2/1987 | Nitta |
| 4,706,212 A | 11/1987 | Toma |

(Continued)

FOREIGN PATENT DOCUMENTS

| EP | 0012777 A1 | 7/1980 |
| EP | 0230340 A2 | 7/1987 |

(Continued)

OTHER PUBLICATIONS

Diaconescu, S., Morphological Categorization Attribute Value Trees and XML, in Mieczyslav A. Klopotek, Slawomir T. Wierzchon, Kryzstof Trojanowski (Eds), Intelligent Information Processing and web Mining, Proceedings of the International IIS: IIPWM '03 Conference, Zakopane, Poland, Jun. 2-5, 2003, Springer, pp. 131-138.

(Continued)

*Primary Examiner* — Farzad Kazeminezhad
(74) *Attorney, Agent, or Firm* — Law Office of Andrei D Popovici, PC

(57) ABSTRACT

In some embodiments, a linguistic knowledge base containing correspondences between pairs of words or multi-word expressions belonging to different natural languages is generated and maintained using a graphical user interface. A linguistic model generates dependency tree representations of each multi-word expression. The dependency trees are simultaneously displayed within a graphical user interface, allowing a user to indicate lexical correspondences between pairs of nodes. Computer-readable (e.g. XML) encodings of the lexical correspondences are generated and stored in the linguistic knowledge base. At least some of the nodes are procedural nodes representing procedures which turn numerals into numeric values or manipulate pictures or sounds embedded in text associated with the node.

22 Claims, 18 Drawing Sheets

(56) References Cited

U.S. PATENT DOCUMENTS

| | | | |
|---|---|---|---|
| 4,724,523 A | 2/1988 | Kucera | |
| 4,783,761 A | 11/1988 | Gray | |
| 4,864,501 A | 9/1989 | Kucera et al. | |
| 4,887,212 A | 12/1989 | Zamora et al. | |
| 4,914,590 A | 4/1990 | Loatman | |
| 4,916,614 A | 4/1990 | Kaji | |
| 4,980,829 A | 12/1990 | Okajima | |
| 4,994,966 A | 2/1991 | Hutchins | |
| 5,060,155 A | 10/1991 | Van Zuijlen | |
| 5,088,038 A | 2/1992 | Tanaka et al. | |
| 5,251,129 A | 10/1993 | Jacobs et al. | |
| 5,323,316 A | 6/1994 | Kadashevich | |
| 5,369,576 A | 11/1994 | Heemels et al. | |
| 5,442,546 A | 8/1995 | Kaji | |
| 5,528,491 A | 6/1996 | Kuno | |
| 5,559,693 A | 9/1996 | Anick et al. | |
| 5,642,519 A | 6/1997 | Martin | |
| 5,659,765 A | 8/1997 | Nii | |
| 5,748,841 A | 5/1998 | Morin | |
| 5,983,169 A | 11/1999 | Kozma | |
| 5,991,712 A | 11/1999 | Martin | |
| 6,101,492 A | 8/2000 | Jacquemin et al. | |
| 6,243,669 B1 | 6/2001 | Horiguchi | |
| 6,332,118 B1 | 12/2001 | Yamabana | |
| 6,676,412 B1 | 1/2004 | Masterson et al. | |
| 6,937,975 B1 | 8/2005 | Elworthy | |
| 7,013,264 B2 | 3/2006 | Dolan | |
| 7,050,964 B2 | 5/2006 | Menzes | |
| 7,085,708 B2 | 8/2006 | Manson | |
| 7,136,807 B2 | 11/2006 | Mueller | |
| 7,167,824 B2 | 1/2007 | Kallulli | |
| 7,324,936 B2 | 1/2008 | Saldanha et al. | |
| 7,565,281 B2 * | 7/2009 | Appleby | 704/2 |
| 7,698,124 B2 * | 4/2010 | Menezes et al. | 704/3 |
| 2002/0013694 A1 | 1/2002 | Murata | |
| 2002/0026308 A1 | 2/2002 | Osborne | |
| 2002/0042707 A1 | 4/2002 | Zhao | |
| 2003/0023423 A1 | 1/2003 | Yamada | |
| 2003/0233226 A1 | 12/2003 | Kim | |
| 2004/0153305 A1 | 8/2004 | Enescu | |
| 2004/0172237 A1 | 9/2004 | Saldanha | |
| 2004/0230418 A1 * | 11/2004 | Kitamura | 704/8 |
| 2004/0243387 A1 | 12/2004 | De Brabander | |
| 2004/0243396 A1 | 12/2004 | Liu et al. | |
| 2005/0091031 A1 | 4/2005 | Powell et al. | |
| 2005/0091036 A1 | 4/2005 | Shackleton | |
| 2006/0009962 A1 | 1/2006 | Monk | |
| 2006/0200336 A1 | 9/2006 | Cipollone et al. | |
| 2006/0200338 A1 | 9/2006 | Cipollone et al. | |
| 2007/0010994 A1 | 1/2007 | Mueller | |
| 2007/0233460 A1 | 10/2007 | Lancaster et al. | |
| 2008/0235199 A1 * | 9/2008 | Li et al. | 707/4 |
| 2009/0006078 A1 | 1/2009 | Selegey et al. | |

FOREIGN PATENT DOCUMENTS

| | | |
|---|---|---|
| EP | 0241717 A2 | 10/1987 |
| EP | 0262938 A1 | 4/1988 |
| EP | 0274281 A1 | 7/1988 |
| EP | 0357370 A2 | 3/1990 |
| EP | 0381288 A1 | 8/1990 |
| EP | 0387960 A1 | 9/1990 |
| EP | 0409425 A2 | 1/1991 |
| EP | 0199464 B1 | 8/1991 |
| EP | 0466516 A2 | 1/1992 |
| EP | 0562818 A2 | 9/1993 |
| EP | 0168814 B1 | 5/1994 |
| EP | 0266001 B1 | 5/1995 |
| EP | 0244871 B1 | 2/1996 |
| EP | 0388156 B1 | 9/1997 |
| EP | 0805403 A2 | 11/1997 |
| EP | 0524694 B1 | 7/1999 |
| EP | 0651340 B1 | 12/1999 |
| EP | 0424032 B1 | 3/2000 |
| EP | 0525470 B1 | 4/2000 |
| EP | 1022662 A1 | 7/2000 |
| EP | 1109110 A9 | 6/2001 |
| EP | 0825531 B1 | 5/2002 |
| EP | 1209560 A1 | 5/2002 |
| EP | 0532338 B1 | 8/2002 |
| EP | 1262880 A2 | 12/2002 |
| EP | 1271340 A1 | 1/2003 |
| EP | 1349079 A1 | 10/2003 |
| EP | 1080424 B1 | 7/2006 |
| JP | 59032062 | 2/1984 |
| JP | 3276367 | 12/1991 |
| JP | 7152767 | 6/1995 |
| WO | 8805946 A1 | 8/1988 |
| WO | 9740452 A1 | 10/1997 |
| WO | 9962002 A1 | 12/1999 |

OTHER PUBLICATIONS

Diaconescu, S., Multiword Expression Translation Using Generative Dependency Grammar, in proceedings of ESTAL 2004—Espana for Natural Language Processing, Oct. 20-22, 2004, Alicante, Spain.

Diaconescu, S.,General System for Normal and Phonetic Inflection, in Corneliu Burileanu, Horia-Nicolai Teodorescu (Eds.), From Speech Processing to Spoken Language Technology, The Publishing House of the Romanian Academy, Bucharest 2009, pp. 149-160.

Diaconescu, S., Natural Language Syntax Description using Generative Dependency Grammar, POLIBITS, No. 38, Jul.-Dec. 2008, ISSN:1870-9044, pp. 5-18.

Diaconescu, S., Complex Natural Language Processing System Architecture, in Corneliu Burileanu, Horia-Nicolai Teodorescu (Eds.) , Advances in Spoken Language Technology, The Publishing House of the Romanian Academy, Bucharest 2007, pp. 228-240.

Diaconescu, S., Crearea resurselor lingvistice cu ajutorul unui limbaj specializat, in Workshop on Linguistic Resources and Tools for Romanian Language Processing, Iasi, Nov. 2006.

Diaconescu, S., Grammar Abstract Language Basics, In GEST International Transaction on Computer Science and Engineering, vol. 10, No. 1, 2005.

Diaconescu, S., Natural Language Agreement Description for Reversible Grammars, in Tamás D. Gedeon, Lance Chun Che Fung (Eds.), AI 2003: Advances in Artificial Intelligence, 16th Australian Conference on AI, Perth, Australia, Dec. 2003, Proceedings, pp. 161-172.

Diaconescu, S., Natural Language Processing Using Generative Indirect Dependency Grammar , in Mieczyslav A. Klopotek, Slawomir T. Wierzchon, Krzysztof Trojanowski (Eds), Intelligent Information Processing and Web Mining, Proceedings of the International IIS: IIPWM'04 Conference, Zakopane, Poland, May 17-20, 2004, Springer, pp. 414-418.

Diaconescu, S., Natural Language Understanding Using Generative Dependency Grammar, in Max Bramer, Alun Preece and Frans Coenen (Eds), ES 2002. Research and Development in Intelligent Systems XIX, Proceedings of ES2002, the Twenty second SGAI International Conference on Knowledge Based Systems and Applied Artificial Intelligence, Cambridge UK, Dec. 2002, Springer, pp. 439-452.

Diaconescu, S., Some Properties of the Attribute Value Trees Used for Linguistic Knowledge Representation, in 2nd Indian International Conference on Artificial Intelligence (IICAI-05) India during Dec. 20-22, 2005.

USPTO, Office Action mailed May 24, 2012 for U.S. Appl. No. 12/486,546, filed Jun. 17, 2009, first inventor Diaconescu, S.S.

USPTO, Office Action mailed May 24, 2012 for U.S. Appl. No. 12/486,597, filed Jun. 17, 2009, first inventor Diaconescu, S.S.

Diaconescu, U.S. Appl. No. 12/486,546, filed Jun. 17, 2009.

Diaconescu, U.S. Appl. No. 12/486,597, filed Jun. 17, 2009.

Diaconescu, U.S. Appl. No. 12/486,629, filed Jun. 17, 2009.

Diaconescu S., Complex Natural Language Processing System Architecture, in Corneliu Burileanu, Horia-Nicolai Teodorescu (Eds.) , Advances in Spoken Language Technology, The Publishing House of the Romanian Academy, Bucharest, Sped Conference, Iasi, Romania, May 10-12, 2007, pp. 228-240.

* cited by examiner

Expression A "to release someone on bail"
    Syntax
        LE1: "to release"   partial variable
            [class = verb]
            Governor LE5, LE6
        LE2: "someone"   total variable
            [class = noun, pronoun]
            Subordinate LE5
        LE3: "on"       invariable
            [class = preposition]
            Subordinate LE6
            Governor LE7
        LE4: "bail"      partial variable
            [class = noun]
            [type = common]
            [gender = masculine]
            Subordinate LE7
    Dependencies
        LE5: @RE1@
        LE6: @RE2@
        LE7: @RE3@

Expression B "a elibera pe cineva pe cauțiune"
    Syntax
        LR1: "a elibera"     partial variable
            [class = verb]
            Governor LR6, LR8
        LR2: "pe"        invariable
            [class = preposition]
            Subordinate LR6
            Governor LR7
        LR3: "cineva"    total variable
            [class = noun, pronoun]
            Subordinate LR7

LR4: "pe"   invariable
            [class = preposition]
            Subordinate LR8
            Governor LR9
        LR5: "cauțiune"   partial variable
            [class = noun]
            [type = common]
            [gender = feminine]
            Subordinate LR9
    Dependencies
        LR6: @RR1@
        LR7: @RR2@
        LR8: @RR3@
        LR9: @RR4@

Expression A      Exp122EN
Expression B      Exp222RO

Change A->B
    Mapping
        LE1/LR1,
        LE2/LR3,
        LE4/LR5
Change B->A
    Mapping
        LR1/LE1,
        LR3/LE2,
        LR5/LE4

```xml
<entry label="Exp122EN" type="MW">
  <multiword>
    <text>
      <normal>to release someone on bail</normal>
    </text>
    <syntacticSection>
     <TA label="LE1" name="release" taType="T" type="P">
      <interpretation>
       <av attribute="class" value="verb"></av>
      </interpretation>
      <governor>
       <relationalLabel>LE5</relationalLabel>
       <relationalLabel>LE6</relationalLabel>
      </governor>
     </TA>
     <TA label="LE2" name="someone" taType="T" type="T">
      <interpretation>
       <av attribute="class" value="noun"></av>
      </interpretation>
      <subordinate>
       <relationalLabel>LE5</relationalLabel>
      </subordinate>
     </TA>
     <TA label="LE3" name="on" taType="T" type="I">
      <interpretation>
       <av attribute="class" value="preposition"></av>
      </interpretation>
      <governor>
       <relationalLabel>LE7</relationalLabel>
      </governor>
      <subordinate>
       <relationalLabel>LE6</relationalLabel>
      </subordinate>
     </TA>
     <TA label="LE4" name="bail" taType="T" type="P">
      <interpretation>
       <av attribute="class" value="noun"></av>
       <av attribute="type" value="common"></av>
       <av attribute="gender" value="masculine"></av>
      </interpretation>
      <subordinate>
       <relationalLabel>LE7</relationalLabel>
      </subordinate>
     </TA>
    </syntacticSection>
    <dependencySection>
     <subordinateRelation label="LE5" name="RE1"></subordinateRelation>
     <subordinateRelation label="LE6" name="RE2"></subordinateRelation>
     <subordinateRelation label="LE7" name="RE3"></subordinateRelation>
    </dependencySection>
  </multiword>
</entry>
```

```xml
<entry label="Exp222RO" type="MW">
  <multiword>
   <text>
    <normal>a elibera pe cineva pe cautiune</normal>
   </text>
   <syntacticSection>
    <TA label="LR1" name="elibera" taType="T" type="P">
     <interpretation>
      <av attribute="class" value="verb"></av>
     </interpretation>
     <governor>
      <relationalLabel>LR6</relationalLabel>
      <relationalLabel>LR8</relationalLabel>
     </governor>
    </TA>
    <TA label="LR2" name="pe" taType="T" type="I">
     <interpretation>
      <av attribute="class" value="preposition"></av>
     </interpretation>
     <governor>
      <relationalLabel>LR7</relationalLabel>
     </governor>
     <subordinate>
      <relationalLabel>LR6</relationalLabel>
     </subordinate>
    </TA>
    <TA label="LR3" name="cineva" taType="T" type="T">
     <interpretation>
      <av attribute="class" value="pronoun"></av>
     </interpretation>
     <subordinate>
      <relationalLabel>LR7</relationalLabel>
     </subordinate>
    </TA>
    <TA label="LE3" name="pe" taType="T" type="I">
     <interpretation>
      <av attribute="class" value="preposition"></av>
     </interpretation>
     <governor>
      <relationalLabel>LR9</relationalLabel>
     </governor>
     <subordinate>
      <relationalLabel>LR8</relationalLabel>
     </subordinate>
    </TA>
    <TA label="LE4" name="cautiune" taType="T" type="P">
     <interpretation>
      <av attribute="class" value="noun"></av>
      <av attribute="type" value="common"></av>
      <av attribute="gender" value="feminine"></av>
     </interpretation>
     <subordinate>
      <relationalLabel>LR9</relationalLabel>
     </subordinate>
    </TA>
   </syntacticSection>
```

FIG. 11-B

```
<dependencySection>
  <subordinateRelation label="LE5" name="RE1"></subordinateRelation>
  <subordinateRelation label="LE6" name="RE2"></subordinateRelation>
  <subordinateRelation label="LE7" name="RE3"></subordinateRelation>
</dependencySection>
  </multiword>
</entry>
<entry>
  <AB>
    <change ch="m" a="LE1" b="LR1"></change>
    <change ch="m" a="LE2" b="LR3"></change>
    <change ch="m" a="LE4" b="LR7"></change>
  </AB>
  <BA>
    <change ch="m" a="LR1" b="LE1"></change>
    <change ch="m" a="LR3" b="LE2"></change>
    <change ch="m" a="LR7" b="LE4"></change>
  </BA>
</entry>
```

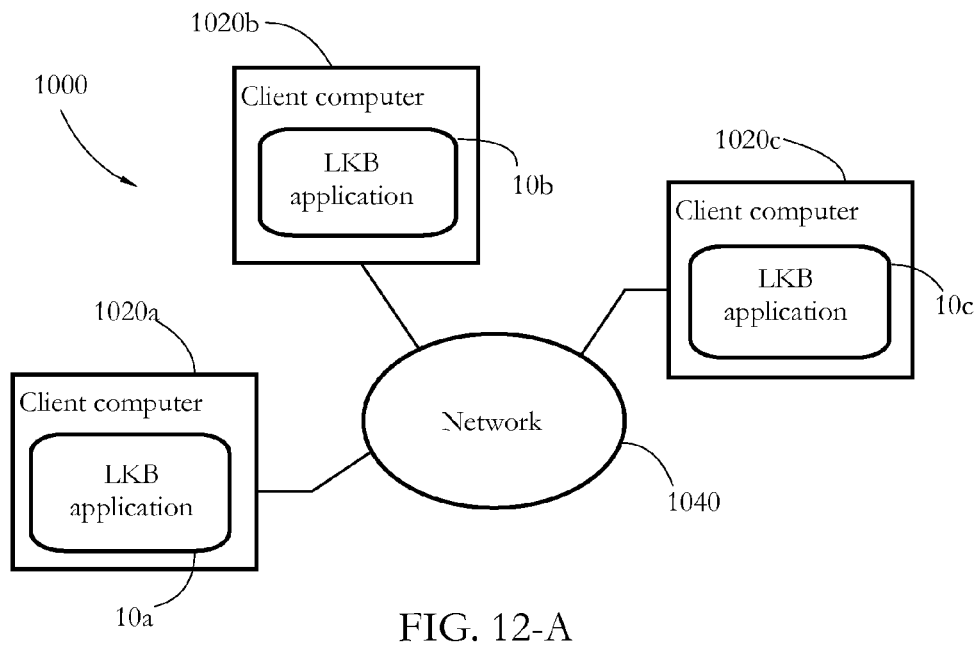
FIG. 12-A
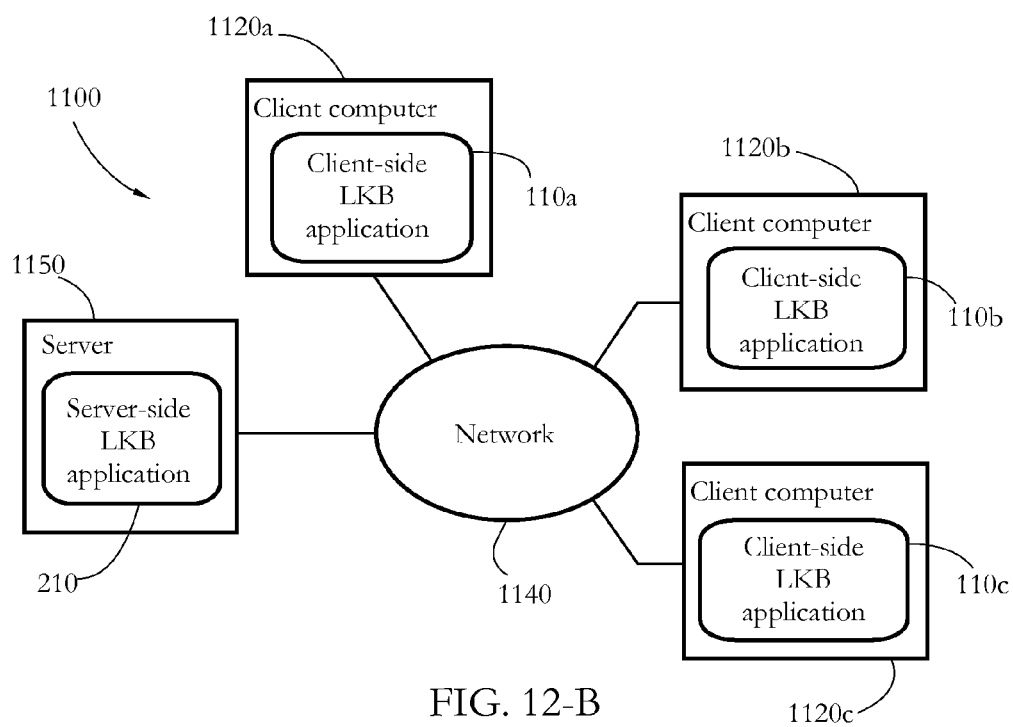
FIG. 12-B

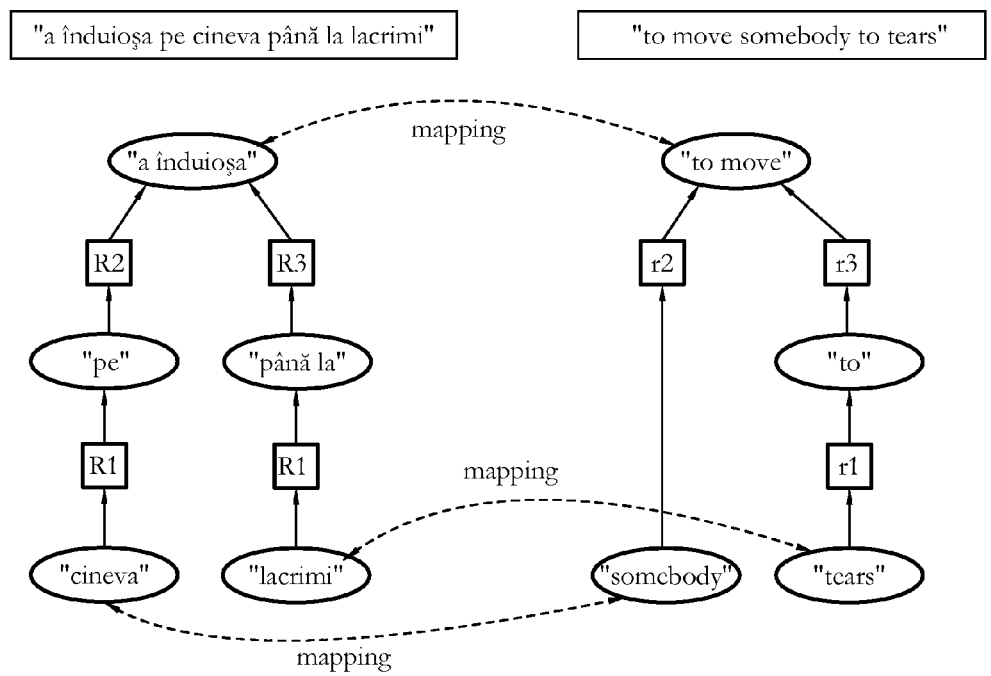
FIG. 15-A
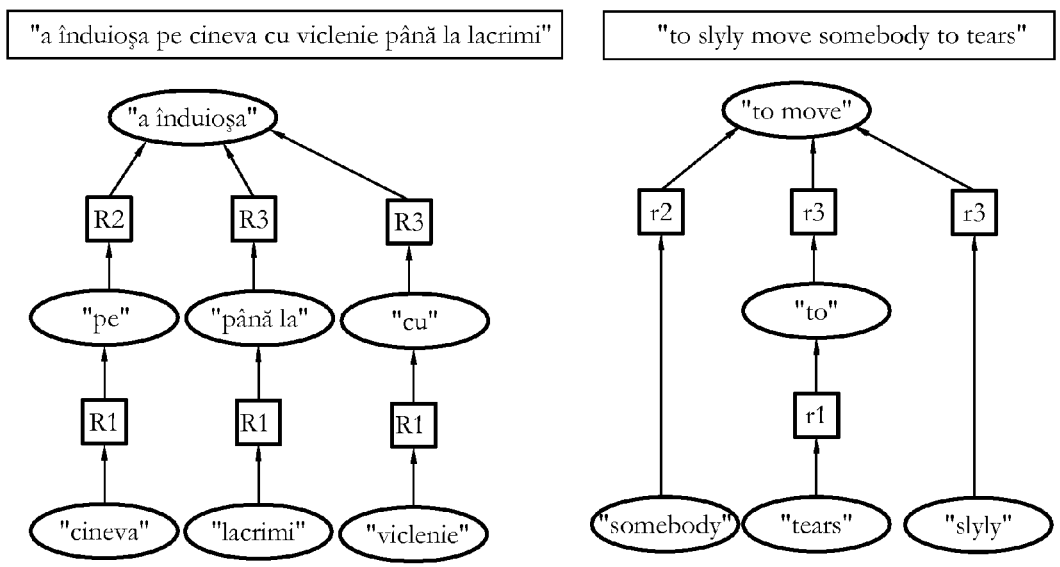
FIG. 15-B

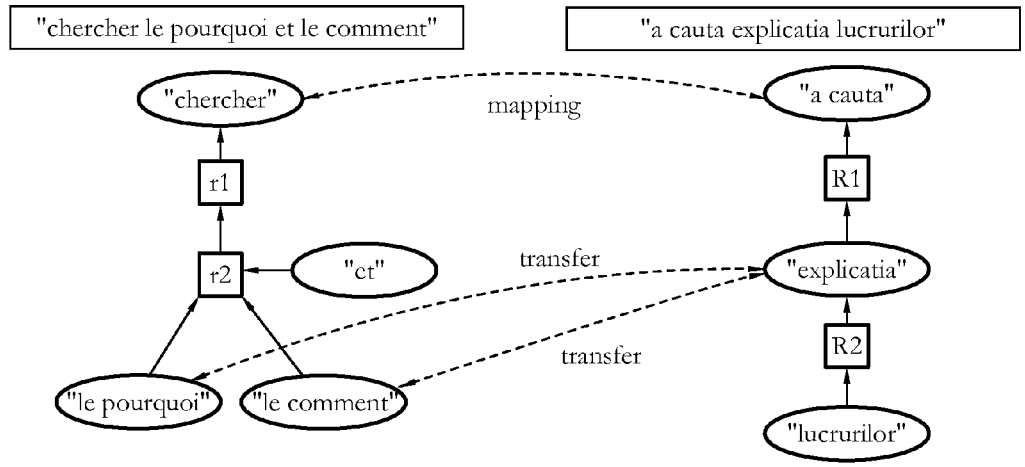
FIG. 16-A
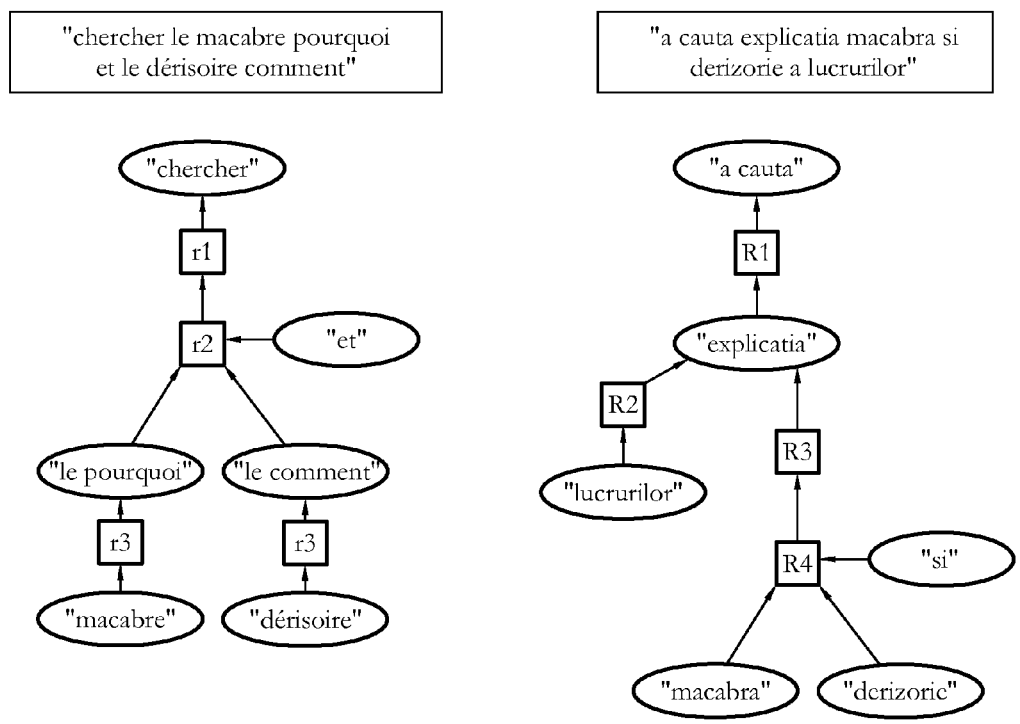
FIG. 16-B

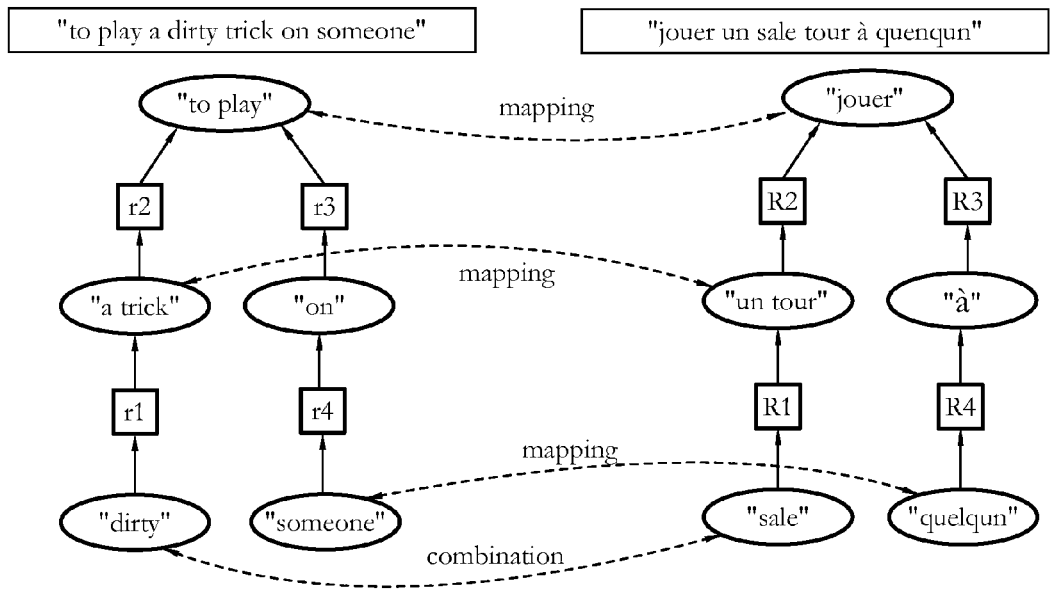
FIG. 17-A
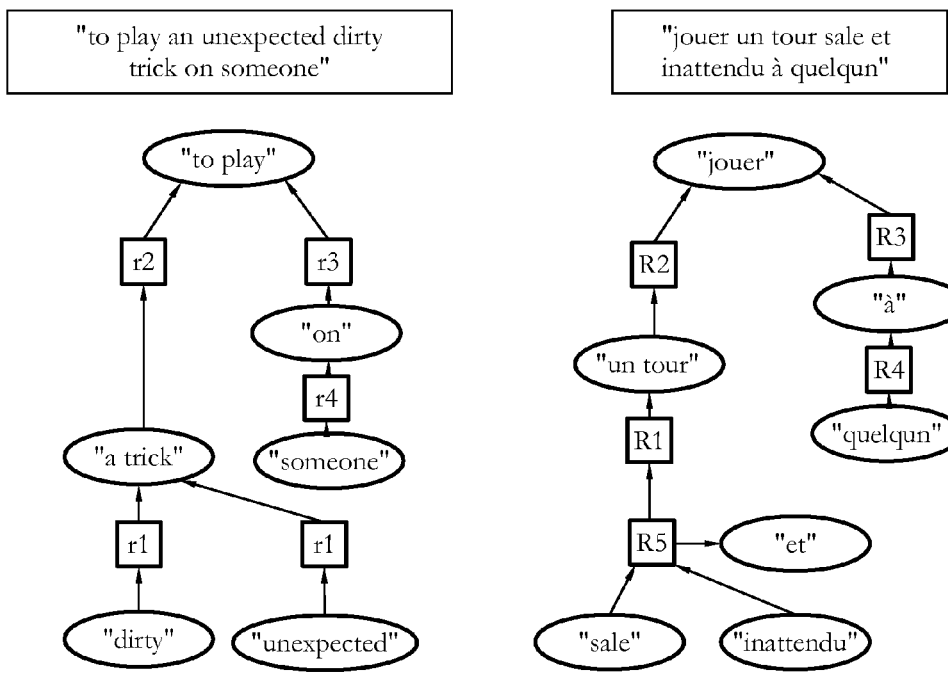
FIG. 17-B

SYSTEMS AND METHODS FOR LEXICAL CORRESPONDENCE LINGUISTIC KNOWLEDGE BASE CREATION COMPRISING DEPENDENCY TREES WITH PROCEDURAL NODES DENOTING EXECUTE CODE

BACKGROUND

The invention relates to methods and systems for computer processing of natural languages.

Commercial interest in computer-based human language processing has been steadily increasing in recent years. Globalization and the widespread use of the Internet are driving the development of automated translation technology, while progress in robotics and software engineering is fueling growth in the area of human-machine interfaces and automated document processing.

Language processing applications often use computer-readable linguistic knowledge bases (LKB) containing information on the grammar, lexicon, and structure of natural languages, as well as on lexical correspondences and other relations between natural languages.

Automated translation has long been considered a difficult task, in part because of the diversity and redundancy of human language. For example, some phrases that express the same notion or message in different languages may not share equivalent words or syntactic structure. Moreover, natural language is often context-sensitive. The meaning of some phrases may be essentially different from that conveyed by their individual words.

Common approaches to natural language processing include dictionary-based, example-based, and corpus-based methods. Dictionary work typically involves the creation of lexical knowledge bases. Example-based methods aim to create large collections of example phrases, and to match incoming text to the stored examples. Corpus-based work often employs statistical models of relationships between words and other linguistic features.

SUMMARY

According to one aspect, a system comprises a lexical correspondence graphical user interface, and a lexical correspondence code generator connected to the lexical correspondence graphical user interface. The lexical correspondence graphical user interface is configured to co-display to a user a first dependency tree of a first multi-word expression in a first natural language and a second dependency tree of a corresponding second multi-word expression in a second natural language, and in response to co-displaying the first and second dependency trees to the user, receive a user input indicating a lexical correspondence between a first node of the first dependency tree and a second node of the second dependency tree. The lexical correspondence code generator is configured to receive an indicator of the user input and to generate computer-readable correspondence code representing the lexical correspondence. In some embodiments, the correspondence code may include grammar abstract language (GAL) and/or extensible markup language (XML) correspondence code.

According to another aspect, a method of creating a linguistic knowledge base includes co-displaying to a user a first dependency tree of a first multi-word expression and a second dependency tree of a second multi-word expression; in response to co-displaying the first dependency tree and the second dependency tree to the user, receiving a user input indicating a lexical correspondence between a first linguistic node of the first dependency tree and a second linguistic node of the second dependency tree; and in response to receiving the user input, generating computer-readable correspondence code representing the lexical correspondence.

According to another aspect, a system comprises a lexicon linguistic knowledge base configured to store a plurality of lexicon entries for each of a plurality of natural languages; a lexical element manager connected to the lexicon linguistic knowledge base, and configured to receive natural language multi-word expressions and generate a structured lexicon entry for each natural language multi-word expression for storage in the lexicon linguistic knowledge base; a lexical correspondence knowledge base storing a plurality of multi-word expression correspondence entries between at least a pair of natural languages of the plurality of natural languages; and a lexical correspondence manager connected to the lexicon linguistic knowledge base and the lexical correspondence knowledge base, and configured to generate multi-word expression correspondence code according to lexicon entries stored in the lexicon linguistic knowledge base and multi-word expression correspondence user input, for updating the lexical correspondence knowledge database.

BRIEF DESCRIPTION OF THE DRAWINGS

The foregoing aspects and advantages of the present invention will become better understood upon reading the following detailed description and upon reference to the drawings where:

FIG. 10 illustrates a grammar abstract language (GAL) representation of the multi-word expressions and lexical correspondences of FIG. 9, according to some embodiments of the present invention.

FIGS. 11-A-C show an exemplary XML representation of the multi-word expressions and lexical correspondences of FIG. 9, according to some embodiments of the present invention.

FIG. 12-A shows an exemplary LKB creation system including multiple client computers, each having a linguistic knowledge base application, according to some embodiments of the present invention.

FIG. 12-B shows and exemplary LKB creation system, including a server computer capable of interacting with multiple client computers, according to some embodiments of the present invention.

FIG. 15-A illustrates an exemplary mapping-type lexical correspondence, according to some embodiments of the present invention.

FIG. 15-B shows how a mapping-type correspondence incorporates an extension of a multi-word expression, according to some embodiments of the present invention.

FIG. 16-A illustrates an exemplary transfer-type lexical correspondence, according to some embodiments of the present invention.

FIG. 16-B shows how a transfer-type correspondence incorporates an extension of a multi-word expression, according to some embodiments of the present invention.

FIG. 17-A illustrates an exemplary combination-type lexical correspondence, according to some embodiments of the present invention.

FIG. 17-B shows how a combination-type correspondence incorporates an extension of a multi-word expression, according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

Figure 1:
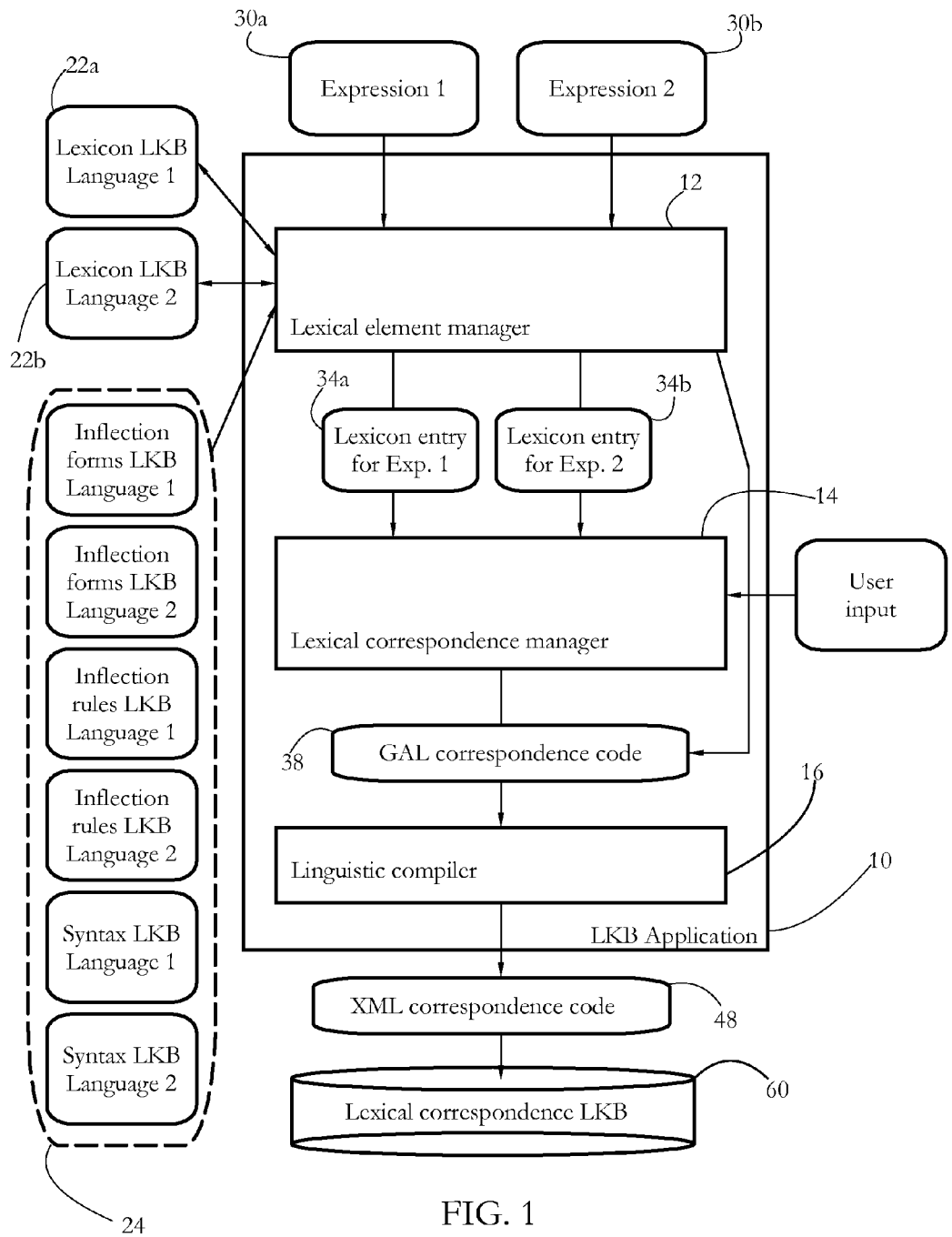
FIG. 1 shows an exemplary linguistic knowledge base (LKB) system (e.g. application) according to some embodiments of the present invention.

FIG. 1 shows a diagram of an exemplary LKB application 10 according to some embodiments of the present invention. LKB application 10 maintains one or more LKBs containing linguistic data for words and multi-word expressions (MWEs) in multiple natural languages. Examples of natural languages include English, French, German, Japanese, and Romanian, among others. LKB application 10 includes a lexical element manager 12, a lexical correspondence manager 14 connected to lexical element manager 12, and a linguistic compiler 16 connected to lexical element manager 12 and lexical correspondence manager 14. LKB application 10 receives data from a pair of lexicon LKBs 22a-b and a morpho-syntactic LKB 24, as well as pairs of natural-language text expressions 30a-b. In some embodiments expressions 30a-b are multi-word expressions, although one or both of expressions 30a-b may also be formed by single words. For clarity, the description below focuses primarily on MWEs. LKB application 10 outputs MWE lexical computer-readable (e.g. XML) correspondence code 48, which may be further incorporated into a lexical correspondence LKB 60. In some embodiments, LKB 60 may also store GAL correspondence code 38, in addition to or instead of XML correspondence code 48.

LKB application 10 receives text expressions 30a-b from storage or an input device. In some embodiments, LKB 10 may perform the steps described below for expressions formed by single words. In a translation embodiment, multi-word expressions 30a-b are formulated in two distinct natural languages or two distinct dialects of the same language, and multi-word expression 30b may be a translation of multi-word expression 30a.

In some embodiments, each lexicon LKB 22a-b includes an inventory of morphemes, words and multi-word expressions of a natural language, stored as lexicon entries. In a translation embodiment, lexicon LKBs 22a and 22b may store lexicon data pertaining to the languages of expressions 30a and 30b, respectively. Morpho-syntactic LKB 24 may comprise syntactic data, as well as inflection rules and inflection forms specific to each natural language. Some embodiments of lexicon LKBs 22a-b and morpho-syntactic LKB 24 may store linguistic data in a computer-readable form such as extensible markup language (XML), in which case a document type definition (DTD) is provided for every data type. For example, in some embodiments lexicon LKBs 22a-b include XML lexicons and associated lexicon DTDs for each language, while morpho-syntactic LKB 24 includes an XML syntax LKB and associated syntax DTD, an XML inflection form LKB and associated inflection form DTD, and an XML inflection rule LKB and associated inflection rule DTD for each language. In some embodiments, common DTDs may be used for all languages. In some embodiments, lexicon LKBs 22a-b and morpho-syntactic LKB 24 may reside on a server computer or on computer readable media, in part or entirely, and may be made available to application 10 over a computer network.

Figure 2:
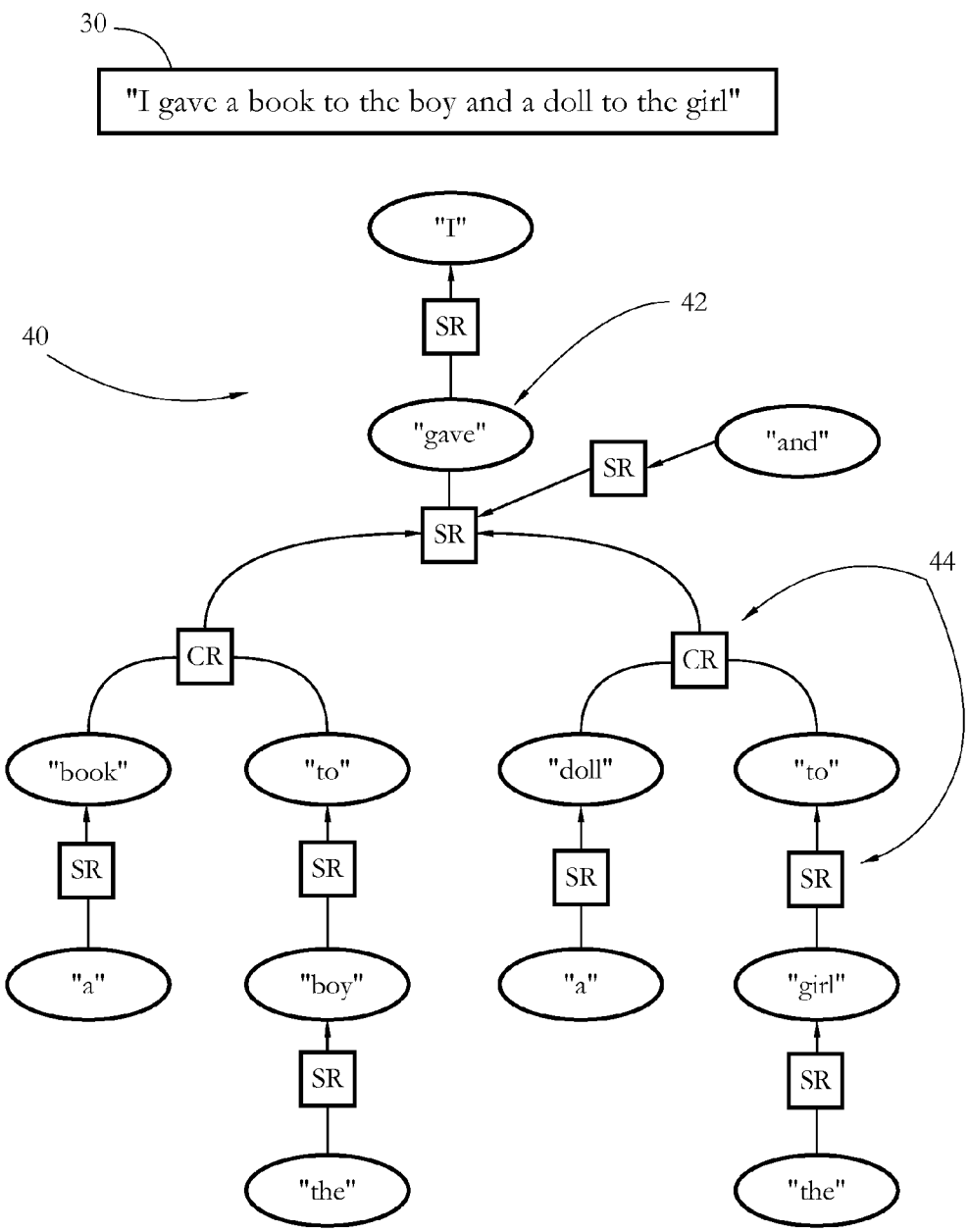
FIG. 2 shows an exemplary dependency tree (DT) associated with a multi-word expression, according to some embodiments of the present invention.

In some embodiments, lexicon entries for MWEs are maintained in the form of dependency trees (DTs). FIG. 2 shows an exemplary dependency tree 40 associated with a natural-language multi-word expression 30. Multi-word expression 30 is a meaningful sequence of words, such as the exemplary phrase "I gave a book to the boy and a doll to the girl" shown in FIG. 2. Dependency tree 40 is a representation of multi-word expression 30 in the form of a hierarchical, branched structure comprising a plurality of linguistic nodes 42 connected by linguistic links 44.

The nodes shown in FIG. 2 are terminal nodes, each representing an individual word. In some embodiments, MWE dependency trees may include terminal nodes, non-terminal nodes, pseudoterminal nodes and/or procedural nodes. Terminal nodes are branch endpoints (leafs), and are not further expanded into dependency trees. An example of a terminal node is a word. In some embodiments, terminal nodes may be invariable, wholly-variable, or partially-variable. Invariable terminal nodes have a fixed form in different instances of an MWE. Wholly-variable terminal nodes can appear as different words in different instances of the same MWE. Partially-variable terminal nodes can appear with different inflexions in different instances of an MWE.

A non-terminal node represents a low-level branch of a dependency tree, and comprises multiple words organized in tree branches. Pseudoterminal nodes may represent categories of words (e.g. nouns) sharing a given grammatical function. An illustrative procedural node may be a procedural node designating the category "noun," which may be instantiated into any noun of the relevant language. Procedural nodes are computer routines executed in relation to the respective node. An illustrative procedural node is a piece of code that turns numerals (e.g. "twenty-four") into their numeric values (e.g. 24). Other procedural nodes may, for example, manipulate pictures or sounds embedded in a piece of text.

In general, a linguistic node such as the nodes 42 shown in FIG. 2 may represent a part (e.g. a word or sub-expression) of an expression, while a linguistic link such as the linguistic links 44 shown in FIG. 2 may represent grammatical relationships between linguistic nodes. For example, a linguistic link 44 may represent the relation between a verb and its direct object. The exemplary illustration of FIG. 2 shows two types of linguistic links 44: a set of coordination relation links (labeled CR), and a set of subordination relation links (labeled SR). In some embodiments, linguistic links may be described at lower levels of abstraction.

Figure 3:
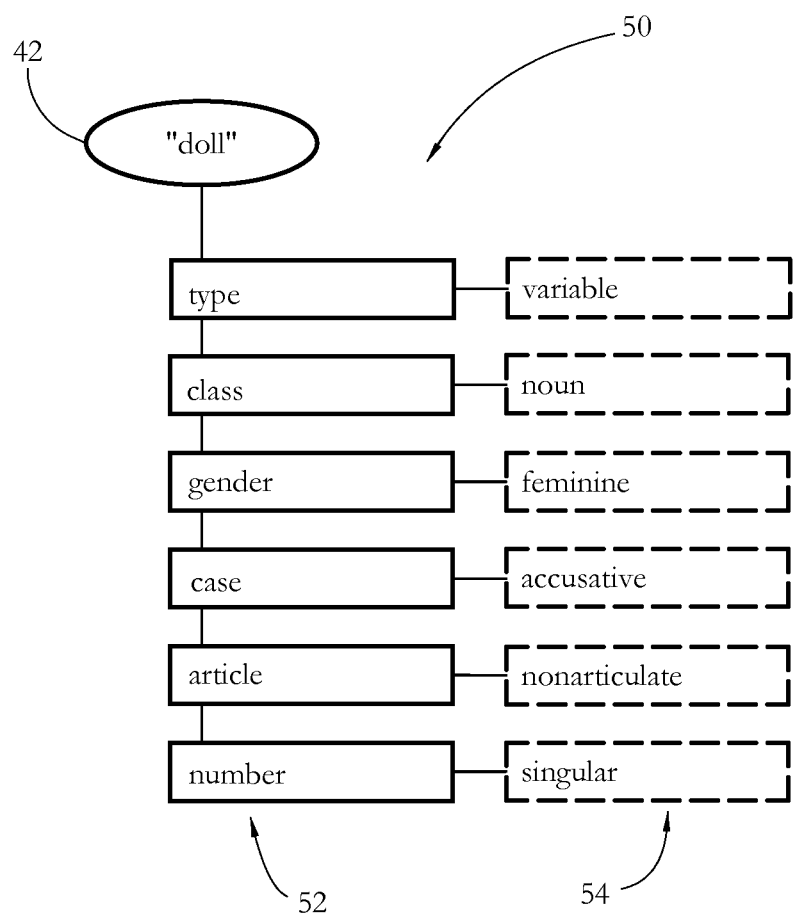
FIG. 3 shows an exemplary attribute-value tree (AVT) associated with a node of a dependency tree, according to some embodiments of the present invention.

In some embodiments, each linguistic node 42 of dependency tree 40 may have an associated attribute-value tree (AVT). FIG. 3 shows an illustrative attribute-value tree 50 associated with the word "doll" shown in FIG. 3. AVT 50 includes a set of attribute nodes 52 each having one or more value (instance) nodes 54 as children. Attribute nodes 52 may represent various linguistic features which describe a given node 42 from the view point of grammar. For example, each attribute node 52 may represent a syntactic or morphological category. Value nodes 54 represent actual instances or values of an attribute node 52 corresponding to a given linguistic node 42. In some embodiments, value nodes 54 themselves may have one or more attribute nodes as children.

In some embodiments, LKB data may be organized according to a Generative Dependency Grammar (GDG). For further information on GDG see for example the article by S. Diaconescu, "Natural Language Understanding Using Generative Dependency Grammar," in *Research and Development in Intelligent Systems XIX, Proceedings of ES2002, the 22nd SGAI International Conference on Knowledge Based Systems and Applied Artificial Intelligence*, Cambridge, UK. 2002. A GDG provides a set of rules for generating a dependency tree (DT) for a multi-word expression (MWE). In exemplary embodiments, each rule relates a left side (left member) to a right side (right member), wherein the left side of each rule contains a non-terminal DT node, and the right side of each rule has two parts: a node sequence, and a DT describing the interrelations of the nodes of the sequence. A terminal DT node, for example a word in a language, is present in that language's lexicon and may appear in the right side of one or more GDG rules. A non-terminal DT node appears at least once in the left side of a GDG rule and may appear in the right side of one or more GDG rules. A rule having a non-terminal node on its left side describes that node, while a rule having a non-terminal node on its right side refers to that node. A pseudoterminal node may appear on the right side of one or more GDG rules, but does not appear on the left side of a GDG rule. A generative process based on a GDG may be applied to some new text to confirm that the text is grammatically correct (accepted by the GDG) and to generate a DT for the new text.

In some embodiments, a description of any dependency tree 40 and associated attribute-value trees 50 may be expressed in a formal language dedicated to linguistic processing, which is denoted below as a Grammar Abstract Language (GAL). A GAL is a high-level language which provides an interface allowing human users to transfer linguistic knowledge to a computing environment in various levels of detail. For an individual natural language, a GAL may describe the language's alphabet, syllabification, lexicon, morphology, syntax, inflection rules and forms. For a pair of natural languages, a GAL may include lexical, morphological, and syntactic correspondence sections describing lexical correspondences between the two languages. In exemplary embodiments, linguistic systems and methods described herein may employ a grammar abstract language as described in the article by S. Diaconescu, "GRAALAN—Grammar Abstract Language Basics", *GESTS International Transactions on Computer Science and Engineering*, Vol. 10, No. 1 (2005).

In some embodiments, linguistic data including dependency tree data and attribute-value tree data may be formulated and stored in a low-level formal language such as an extensible markup language (XML). For XML linguistic data, document type definitions (DTD) may be provided for each data type.

Figure 4:
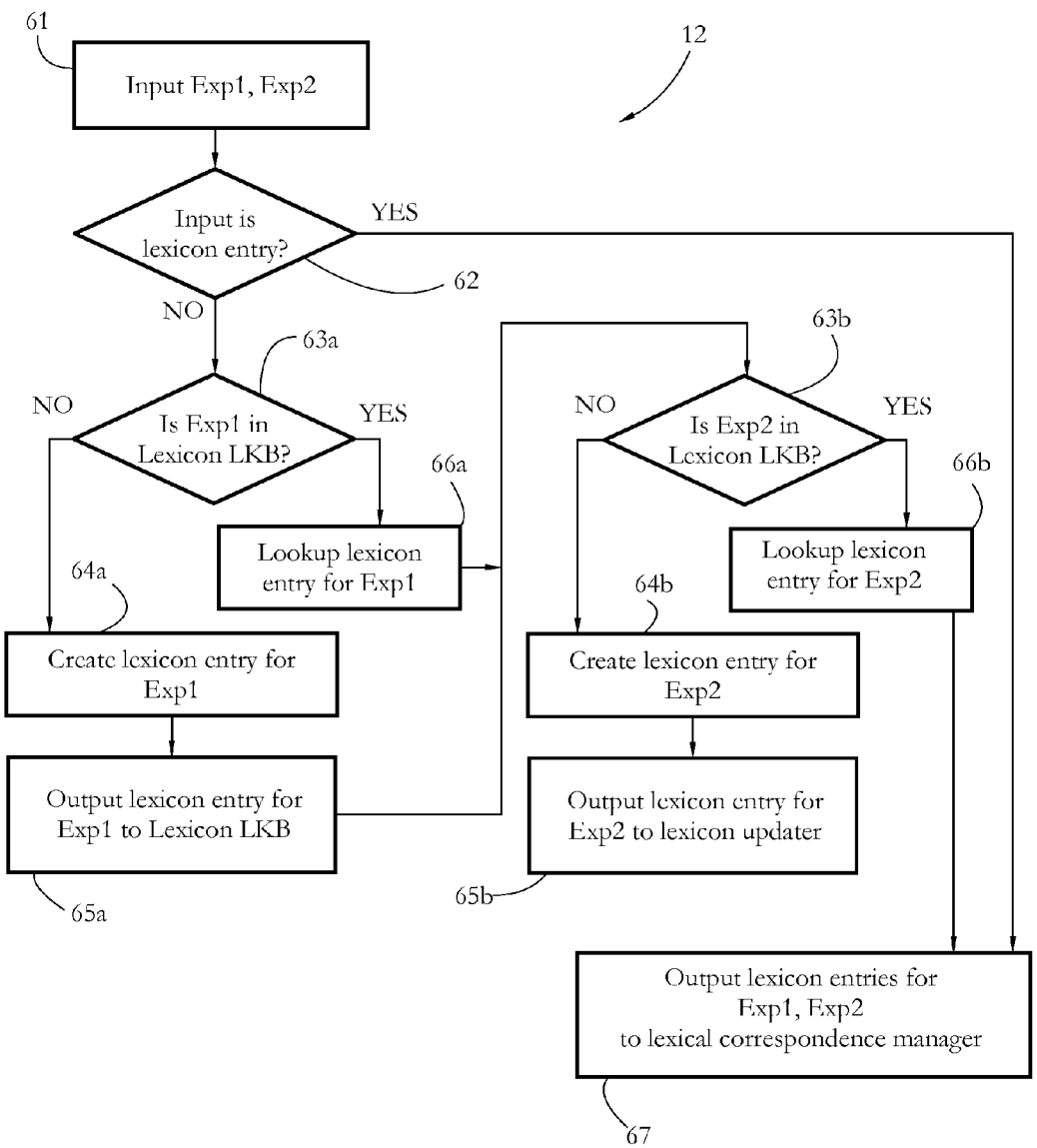
FIG. 4 shows an exemplary sequence of steps performed by a lexical element manager, according to some embodiments of the present invention.

FIG. 4 shows an exemplary set of steps performed by lexical element manager 12 (FIG. 1) according to some embodiments of the present invention. Lexical element manager 12 receives a pair of expressions (MWE) 30*a-b* in natural language text form and outputs lexicon entries 34*a-b* corresponding to MWE's 30*a-b* to lexical correspondence manager 14. In a step 61, MWE's 30*a-b* are input from storage or a user input device. Some embodiments of lexical element manager 12 may accept input in GAL, XML, or in plain text form. If input is formulated already as a GAL correspondence, lexical element manager 12 may forward it directly to linguistic compiler 16 (FIG. 1). A step 62 checks whether MWE's 30*a-b* are given as lexicon entries. If yes, lexical element manager 12 proceeds to a step 67, in which lexicon entries 34 are output to lexical correspondence manager 14 (FIG. 1). If no, a step 63*a* checks whether MWE 30*a* already has an entry in the corresponding lexicon LKB 22*a*. If yes, lexical element manager 12 reads the lexicon entry for MWE 30*a* from lexicon LKB 22*a* (step 66*a*) and proceeds to a step 63*b*. If no, a step 64*a* creates the lexicon entry for MWE 30*a*. In some embodiments, step 64*a* may include consultation of the syntax, inflection rule and inflection form components of morpho-syntactic LKB 24 (FIG. 1) and computation of the respective attribute-value trees 50 for MWE 30*a*. In a step 65*a*, lexical element manager 12 outputs the newly formulated lexicon entry 34*a* to lexicon LKB 22*a*. A step 63*b* checks whether lexicon LKB 22*b* already contains an entry for MWE 30*b*. If no, a step 64*b* computes the lexicon entry 34*b* of MWE 30*b* as described above and a step 65*b* outputs lexicon entry 34*b* to lexicon LKB 22*b*. If yes, lexicon entry 34*b* is read from lexicon LKB 22*b* (step 66*b*). In a step 67, lexicon entries 34*a-b* are output to lexical correspondence manager 14 (FIG. 1).

Figure 5:
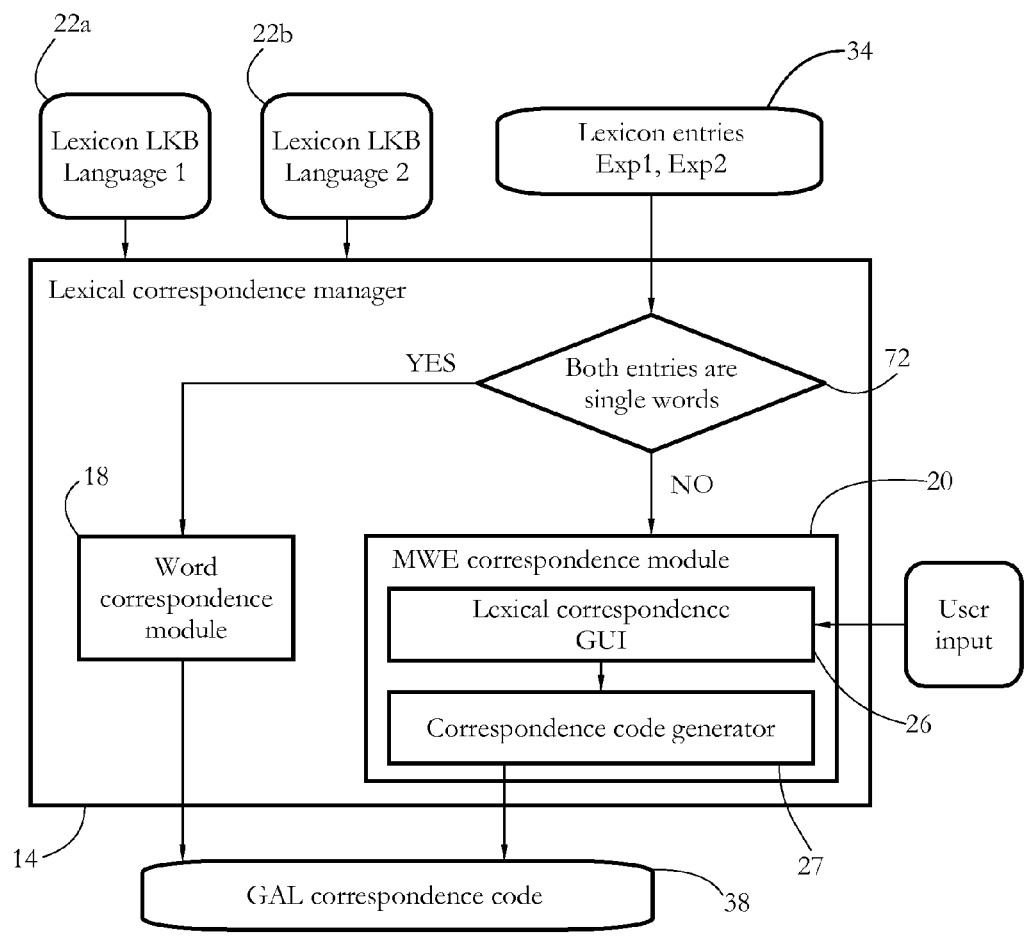
FIG. 5 shows an exemplary operational diagram of a lexical correspondence manager, according to some embodiments of the present invention.

FIG. 5 shows an exemplary diagram of lexical correspondence manager 14 according to some embodiments of the present invention. Lexical correspondence manager 14 includes a word correspondence module 18 and a multi-word expression correspondence module 20. MWE correspondence module 20 includes a lexical correspondence graphical user interface (GUI) 26, and a GAL lexical correspondence code generator 27 connected to GUI 26.

Lexical correspondence manager 14 receives lexicon entries 34*a-b* from lexical element manager 12 and outputs GAL correspondence code 38 to linguistic compiler 16 (FIG. 1). Upon receiving lexicon entries 34*a-b*, lexical correspondence manager 14 determines whether the lexicon entries correspond to single words and/or MWEs (step 72). Step 72 may include consultation of lexicon LKBs 22*a-b*. If both lexicon entries 34*a-b* correspond to single words, word correspondence module 18 formulates GAL correspondence code 38 describing the lexical correspondence between the two words, and outputs GAL correspondence code 38 to linguistic compiler 16. In some embodiments, to formulate GAL correspondence code 38 for two words, word correspondence module 18 uses XML LKB lexicon entries for the two words in corresponding lexicon LKBs 22*a-b* and appropriate lexicon XML DTDs.

If at least one of the input lexicon entries 34*a-b* describes a multi-word expression, lexical correspondence manager 14 invokes MWE correspondence module 20. GUI 26 receives lexical correspondence user input, and lexical correspondence code generator 27 generates GAL lexical correspondence code 38 in response to the received user input, as described below. MWE correspondence module 20 outputs GAL correspondence code 38 to linguistic compiler 38.

Figure 6:
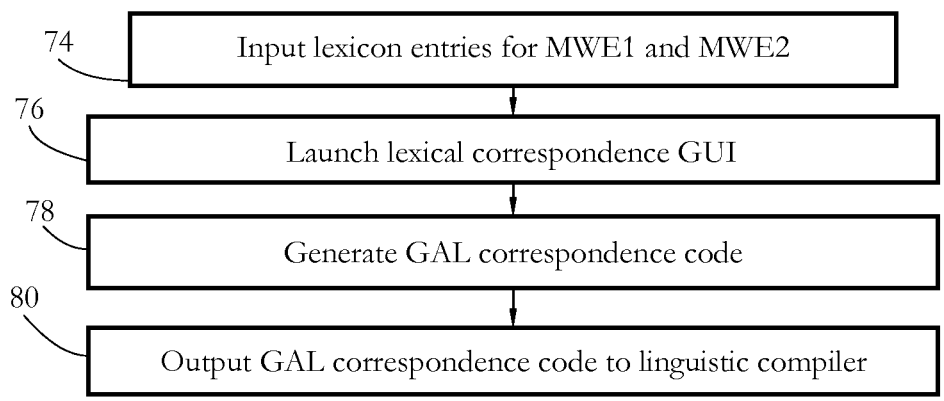
FIG. 6 shows an exemplary sequence of steps performed by a multi-word expression correspondence module forming part of the lexical correspondence manager, according to some embodiments of the present invention.

FIG. 6 illustrates an exemplary sequence of steps performed by MWE correspondence module 20 according to some embodiments of the present invention. In a step 74, lexicon entries 34*a-b* are input from lexical element manager 12. A step 76 invokes lexical correspondence GUI 26 (FIG. 5). Based on the output of lexical correspondence GUI 26, lexical correspondence code generator 27 (FIG. 5) formulates GAL correspondence code 38 describing the lexical correspondence between MWE 30*a* and MWE 30*b* (step 78), and outputs GAL correspondence code 38 to linguistic compiler 16 (step 80).

Figure 7:
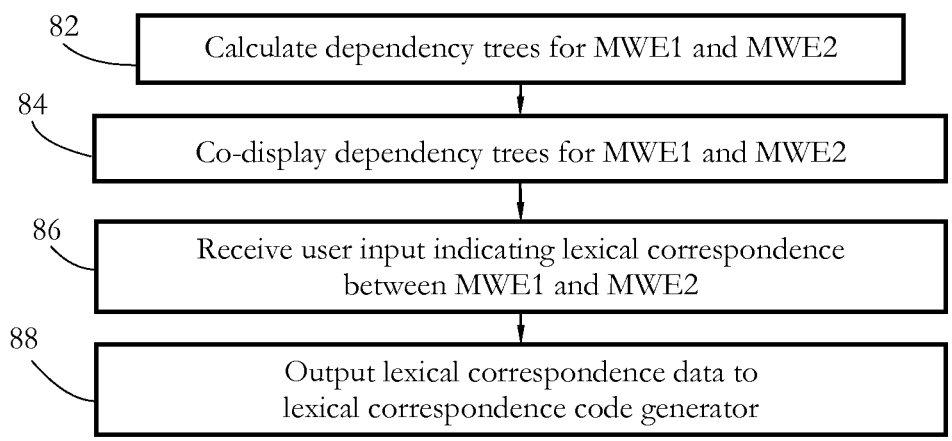
FIG. 7 shows an exemplary sequence of steps performed by a lexical correspondence graphical user interface, according to some embodiments of the present invention.

FIG. 7 shows an exemplary sequence of steps performed by lexical correspondence GUI 26 according to some embodiments of the present invention. In a step 82, GUI 26 generates the dependency trees 40*a-b* corresponding to the two MWEs 30*a-b* based on lexicon entries 34*a-b*. In a step 84, lexical correspondence GUI 26 co-displays the dependency trees 40*a-b* on a display device of a client computer system, as described in detail below. In a step 86, GUI 26 requests and receives user input indicating the identities and types of lexical correspondences between corresponding nodes of multi-word expression 30*a* and multi-word expression 30*b*. In a step 88, data describing the user-indicated lexical correspondences is output to lexical correspondence code generator 27 (FIG. 5).

Figure 8:
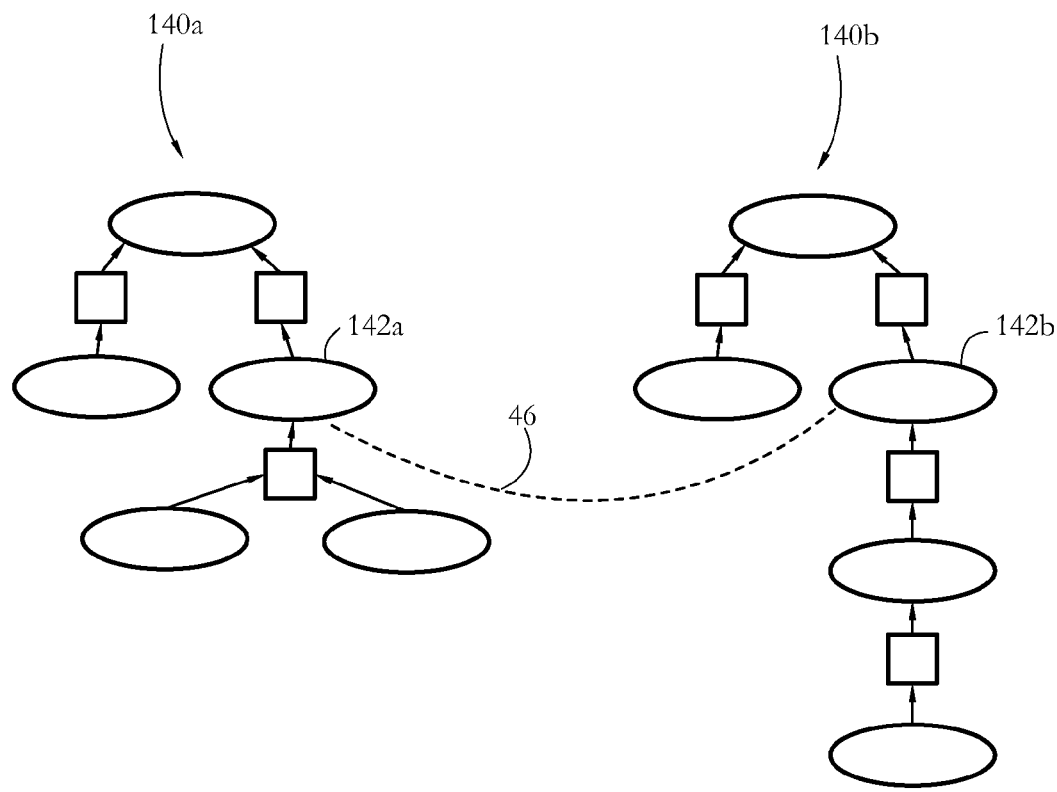
FIG. 8 illustrates an exemplary co-display of two dependency trees and an associated exemplary lexical correspondence, according to some embodiments of the present invention.

FIG. 8 illustrates an exemplary co-display of a pair of dependency trees 140*a-b* on a display device. Co-displaying dependency trees 140*a-b* comprises showing the dependency trees 140*a* and 140*b* in a manner which makes both simultaneously visible (e.g., on the same computer screen) and accessible to a user for further manipulation. Some embodiments may additionally co-display certain node attributes or entire attribute-value trees 50 associated with at least some nodes of dependency trees 140*a-b*. For example, each terminal or procedural node may include or be associated with a displayed variability indicator showing whether the node is partially variable, totally variable, or invariable.

In FIG. 8, a lexical correspondence 46 links a node 142*a* of dependency tree 140*a* to a node 142*b* of dependency tree 140*b*. A simple example of lexical correspondence 46 relates a pair of words which are exact translations of each other. Other lexical correspondences may relate non-terminal DT nodes. Some embodiments of lexical correspondence GUI 26 allow a user to select correspondent nodes 142*a-b* by means of an input device (e.g. mouse) of the client computer. In response to the user selection, GUI 26 displays a graphical connection between the respective nodes 142*a-b*. For example, lexical correspondence GUI 26 may allow the user to click node 142*a* and node 142*b*, and then may automatically draw a line or other graphic connection connecting the selected nodes in response to the user click. An alternative embodiment may show nodes 142*a-b* using identical colors and/or fonts.

In some embodiments, lexical correspondence GUI 26 is configured to receive user input specifying one of a set of predefined types of lexical correspondence between nodes 142*a-b*. In some embodiments, defined lexical correspondence types include mapping, transfer, and combination correspondences. In some embodiments, once GUI 26 establishes that there is a lexical correspondence between two nodes such as 142*a-b*, the user may be prompted to indicate (e.g. by pressing m, t, or c) the type of correspondence between the nodes, or may be given an opportunity to indicate (e.g. by pressing t or c) whether the correspondence type differs from a default type (e.g. mapping).

Mapping correspondences are lexical correspondences between a source terminal node of a first expression and an equivalent target terminal node of a second expression. When a MWE is translated from a language L1 into a language L2, extensions of an L1 MWE are also taken to be extensions of the corresponding L2 MWE. Transfer correspondences are lexical correspondences between non-equivalent nodes of MWEs, for which extensions are nonetheless transferred from L1 to L2. For example, a transfer correspondence connects two words which are not exact translations of each other, but can be treated in the given context as if they were. Combination correspondences are lexical correspondences which involve introducing a new coordination relation, besides indicating the target and source MWE terminal nodes. If a user indicates that a given link is of a combination type, GUI 26 is configured to further receive user input indicating a terminal node to be used for the combination process, and the type of coordination relation to be used. Exemplary transfer and combination correspondences are shown below in FIGS. 16-A-B and 17-A-B. Other types of correspondences may be used in order to allow a linguistic system to, for example, automatically generate the translation of a variation of an original expression from the translation of the original expression.

In general, lexical correspondences between two languages need not be symmetrical. For example, in a transfer correspondence, one target node may be connected to a plurality of source nodes (see FIGS. 16-A-B). Also, in combination-type connections the type of coordination relation acting at the source node may differ from the one at the target node.

As shown in FIG. 1, linguistic compiler 16 inputs lexical correspondence data formulated in grammar abstract language (GAL) from lexical correspondence manager 14 and outputs lower-level computer-readable correspondence code 48 corresponding to the respective GAL correspondence code 38. In some embodiments, linguistic compiler 16 outputs data in an extensible markup language (XML) format. Exemplary GAL and corresponding XML correspondence code is shown below in FIGS. 10 and 11-A-C.

Figure 9:
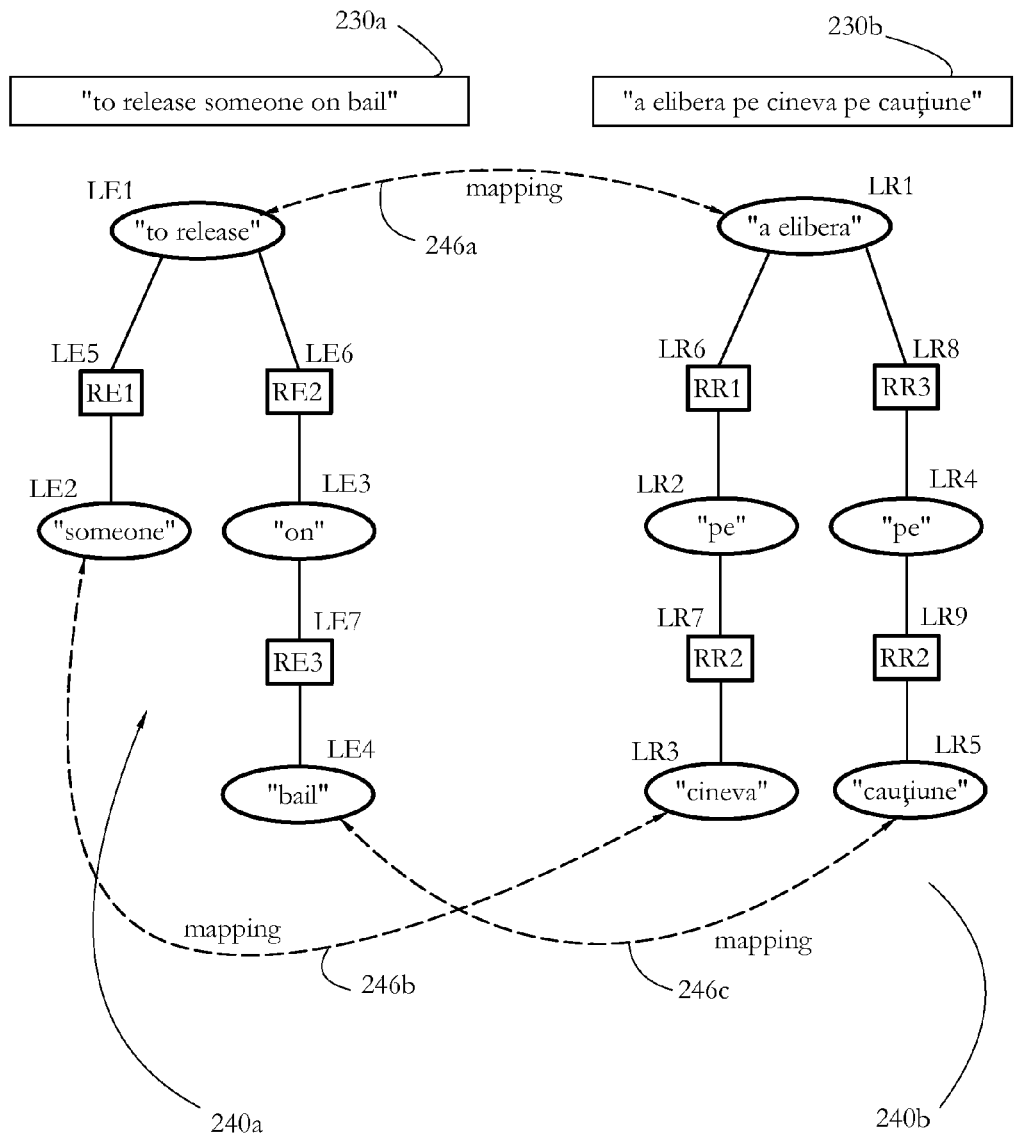
FIG. 9 shows two exemplary multi-word expressions having a number of lexical correspondences, according to some embodiments of the present invention.

FIGS. 9, 10, and 11-A-C show an exemplary pair of corresponding English and Romanian MWEs 230a-b and associated lexical correspondences 246a-c (FIG. 9), GAL correspondence code 38 (FIG. 10) and XML correspondence code 48 (FIGS. 11-A-C) for MWEs 230a-b, according to a translation embodiment of the present invention. The English MWE 230a "to release someone on bail" may be translated as the Romanian MWE 230b "a elibera pe cineva pe cautiune."

FIG. 9 shows dependency tree representations 240a-b of MWE's 230a-b. Linguistic elements (nodes and links) of the English MWE are labeled LE1-LE7, while the linguistic elements of the Romanian MWE are labeled LR1-LR9. Linguistic links RE1-RE3 (for MWE 230a) and RR1-RR4 (for MWE 230b) represent grammatical relationships between pair of words in each MWE. For example, RE1 is the relationship between a verb ("to release") and its direct object ("someone"). Mapping-type lexical correspondences 246a-c relate "to release" to "a elibera," "someone" to "cineva," and "bail" to "cautiune," respectively.

FIG. 10 shows an exemplary grammar abstract language (GAL) representation of MWE's 230a-b, and GAL correspondence code 38 defining lexical correspondences 246a-c between MWEs 230a-b. The GAL expression of an MWE may contain a syntax section, and a section describing the dependency-tree structure of the respective MWE. The syntax section may contain an attribute-value tree (AVT) for each linguistic node and an indication of its relation (e.g., governor, subordinate) to the neighboring linguistic elements. Some embodiments of GAL correspondence code 38 may enumerate the labels of the corresponding linguistic nodes and may specify the type (in this case, "mapping") of each lexical correspondence.

FIGS. 11A-C show an exemplary XML code fragment describing the MWE pair 230a-b, and XML correspondence code 48 defining the three lexical correspondences 246a-c shown in FIG. 9. The XML code shown in FIGS. 11-A-C contains essentially the linguistic information of the GAL code of FIG. 10, with each code entry labeled by corresponding tags defined in respective DTDs. FIG. 11-A shows an exemplary lexicon entry 34 for the MWE "to release someone on bail". Some embodiments of lexicon entry 34 may include a syntactic section and a dependency section. The syntactic section may enumerate all linguistic nodes of the MWE, and may explain the relationship of each node to neighboring nodes (e.g., governor, subordinate). In some embodiments, an AVT is listed for each linguistic node. FIG. 11-B and 11-C show the lexicon entry for MWE 230b and the XML correspondence code 48 describing the lexical correspondences 246a-c. The lexicon entry for MWE 230b is shown in FIG. 11-B and the top part of FIG. 11-C. Some embodiments of XML correspondence code 48 may enumerate the labels of corresponding linguistic nodes and may specify the type (e.g. mapping) of each lexical correspondence FIG. 12-A shows a computer-based linguistic knowledge base creation and maintenance system 1000 according to some embodiments of the present invention. System 1000 includes a plurality of client computers 1020a-c connected through a network 1040. Network 1040 may be a wide-area network such as the Internet. Parts of network 1040 may also include a local area network (LAN). Client computers 1020a-c include corresponding LKB applications 10a-c configured to create and update linguistic knowledge as described in detail above.

FIG. 12-B shows a LKB creation and maintenance system 1100 according to some embodiments of the present invention. System 1100 includes a server 1150 connected to a plurality of client computers 1120a-c through a network 1140. In this embodiment, a linguistic knowledge base is stored on server 1150 and is managed by a server-side LKB application 210. System 1100 allows a plurality of client computers 1120a-c to remotely access and modify the LKB through client-side LKB applications 110a-c, respectively. In some embodiments, each client-side LKB applications 110a-c may include a client/server communication interface and/or an internet-based program such as a browser interface.

Figure 13:
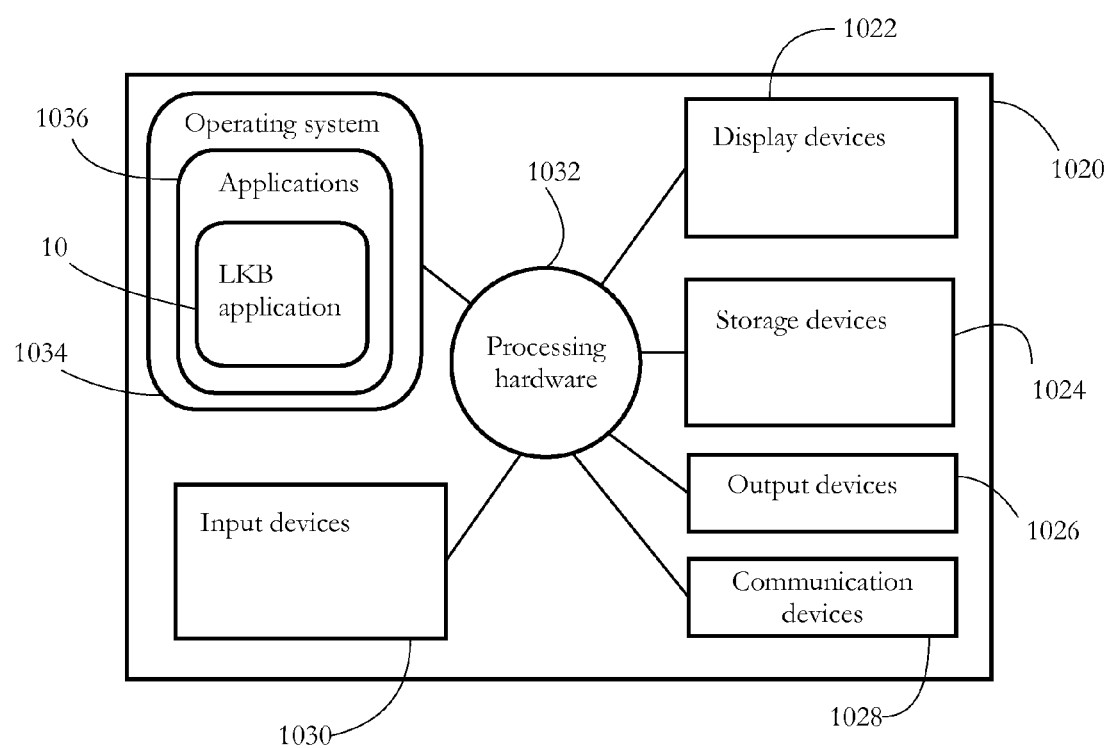
FIG. 13 shows a high-level diagram of a client computer having a LKB application, according to some embodiments of the present invention.

FIG. 13 shows a high-level diagram of a client computer 1020 hosting LKB application 10. Client computer 1020 includes storage devices 1024, input devices 1030, display devices 1022, output devices 1026, and communication devices 1028, all connected to processing hardware 1032. The operation of hardware 1032 is controlled by an operating system 1034. Storage devices 1024 include computer-readable media used for information storage and retrieval. Such computer-readable media may encode instructions to perform methods steps as described herein, as well as data structures described herein. Input devices 1030 may include computer keyboards, mice, microphones, and graphics tablets, among others. Display devices 1022 may include monitors and multimedia projectors. Output devices 1026 may include printers. Communication devices 1028 may include network adapters. A plurality of software applications 1036 may run under operating system 1034, including LKB application 10.

The exemplary systems and methods described above allow the creation and maintenance of a linguistic knowledge base containing correspondences between pairs of words or multi-word expressions. Various embodiments of the present invention can be used in a number of computer-based linguistic applications, such as morphological analyzers, grammar and spelling checkers, thesauri, indexers, databases, search engines, as well as tools for automated or machine-assisted translation.

Figure 14:
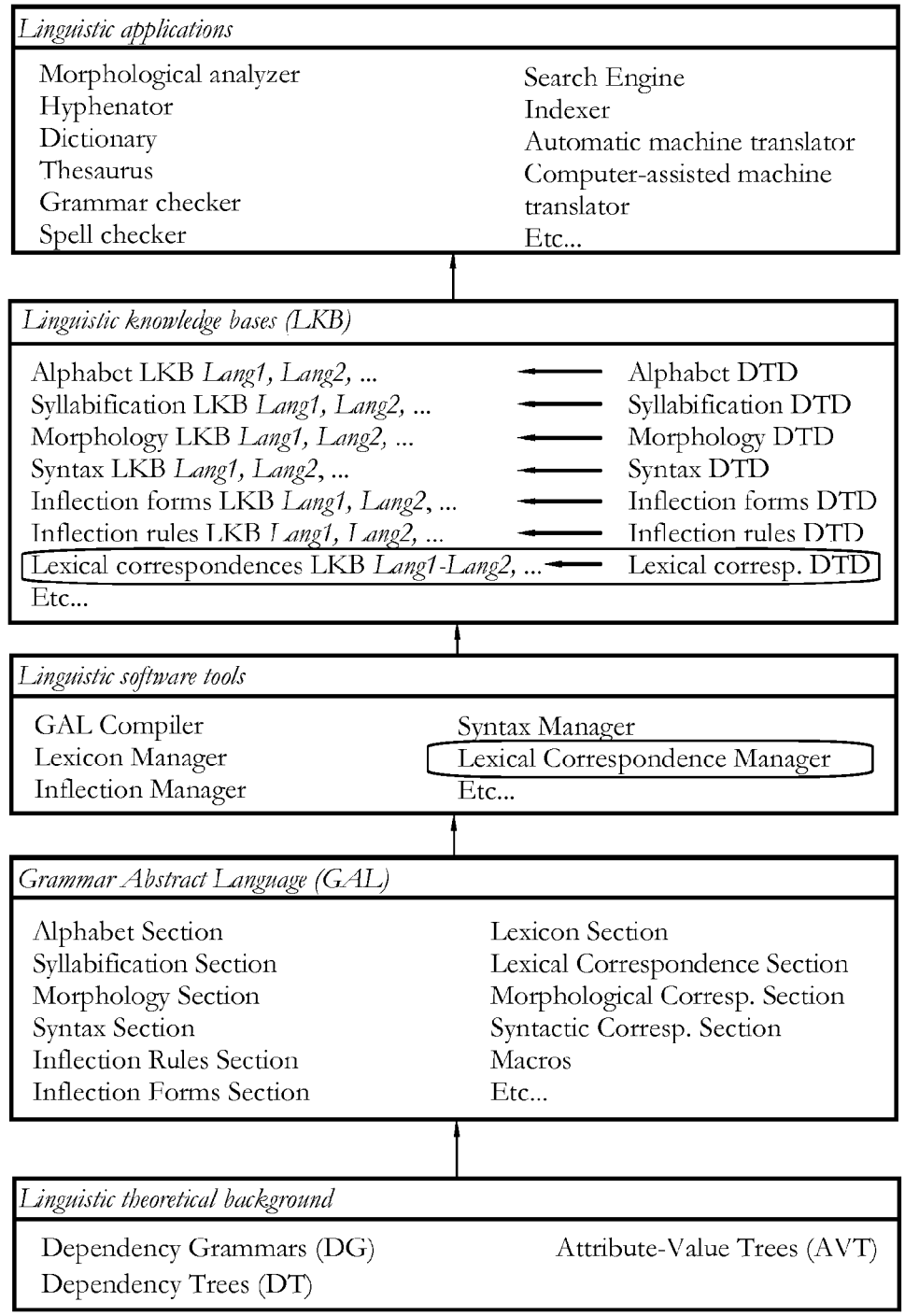
FIG. 14 shows a schematic overview of a LKB development environment and associated applications, according to some embodiments of the present invention.

An exemplary linguistic knowledge base development environment including linguistic applications is shown in FIG. 14. Computer-based linguistic applications may be based on a theoretical background provided by a variety of linguistic representations, such as the dependency grammar models, dependency trees and attribute value trees discussed above. Starting from such grammatical representations of language, a formal grammar abstract language (GAL) may be developed. The GAL allows a systematic characterization of natural language using categories/sections such as alphabet, syllabification, morphology, syntax, inflection rules and forms, lexicon, as well as lexical, morphological, and syntactic correspondence sections. A number of linguistic software tools such as a GAL compiler and lexicon, inflection, syntax and lexical correspondence managers may be used to generate a number of linguistic knowledge bases (LKBs). For XML data, the LKBs may include associated DTDs. Exemplary LKBs may include alphabet, syllabification, morphology, syntax, inflection rules and forms, lexicon, as well as lexical, morphological, and syntactic correspondence LKBs. The LKBs may be employed in a variety of linguistic processing applications. Exemplary linguistic applications may include a morphological analyzer, hyphenator, dictionary, thesaurus, grammar and spell checker, search engine, indexer, and automatic and/or computer-assisted machine translators, among others.

In an exemplary translation embodiment, the methods and systems described above allow a user to define lexical correspondences between phrases or expressions belonging to different natural languages. Natural languages are often context-sensitive; the meaning of a word may change significantly between different multi-word expressions containing the word. Knowing an exact translation of a word may not be sufficient to accurately translate a phrase containing the respective word.

In general, a grammar model may be used to generate a linguistic representation of a phrase or fragment of human communication. Some known grammar models include dependency grammars, generative grammars, and operator grammars. A linguistic representation which uses nodes and links offers a synthetic and concise image of a text fragment, reflecting the syntactic and/or logical make-up of that particular group of words. For example, in a dependency grammar model, a linguistic node may represent a grammatical entity such as a word, while a linguistic link may represent a syntactic relationship between a pair of words (e.g., coordination, subordination). In an operator grammar embodiment, a linguistic node may represent a semantic entity, while a linguistic link may represent a process (e.g., logical inference) involving a pair of linguistic nodes.

FIG. 15-A illustrates a set of mapping lexical correspondences between two multi-word expressions in a translation embodiment of the present invention. The Romanian expression "a înduioş a pe cineva până la lacrimi" has the English translation "to move somebody to tears". In the dependency tree representations shown, linguistic nodes (individual words) are connected by linguistic links representing grammatical relations between the individual words (e.g., r2 represents the relation between the verb "to move" and its direct object "somebody"). In the example of FIG. 15-A, there are mapping correspondences between the words "to move" and "a misca", "somebody" and "cineva", and "tears" and "lacrimi", respectively.

FIG. 15-B shows the effect of the mapping correspondences in FIG. 15-A on possible variations of the original multi-word expressions. A mapping-type correspondence ensures that any extension of MWE1 that involves a mapping-type node gets mirrored in the representation of MWE2. The word sequence "cu viclenie" (Romanian for "slyly") is an extension of the multi-word expression "a înduioş a pe cineva până lacrimi" and connects to the node "a înduioş a" by the same type of relation link R3 as the sequence "până la lacrimi". A linguistic system may use the mapping correspondences in FIG. 15-A to automatically translate a new MWE "a înduioă a pe cineva cu viclenie până la lacrimi" in the following manner: since "lacrimi" is mapped into "tears" and "a înduioş a" is mapped into "to move", attach the extension "slyly" to the dependency tree of the original multi-word expression "to move somebody to tears", in a position fully equivalent to that of the word sequence "to tears", i.e, connected to the node "to move" by the same type of relation link (r3).

FIG. 16-A illustrates a transfer lexical correspondence in a French-to-Romanian translation embodiment. The French MWE "chercher le pourquoi et le comment" has the approximate Romanian equivalent "a cauta explicatia lucrurilor." In the dependency tree representations shown in FIG. 16-A, "chercher" maps into "a cauta," while transfer correspondences relate both "pourquoi" and "comment" to "explicatia." Transfer correspondences may transfer any extension of the source expression onto the target expression, even if the correspondent nodes are not exact translations of each other. This property is illustrated in FIG. 16-B. The coordination relation between "comment" and "pourquoi" is transferred over to the translations of the extensions "macabre" and "dérisoire". Consequently, the expression "chercher le macabre pourquoi et le dérisoire comment" may be translated as "a cauta explicatia macabra si derizorie a lucrurilor."

FIG. 17-A illustrates a combination lexical correspondence in an English-to-French translation embodiment. The MWE "to play a dirty trick on someone" has the approximate French equivalent "jouer un sale tour á quelqun." In the dependency tree representations shown in FIG. 17-A, "to play" maps into "jouer," "a trick" maps into "un tour," and "someone" maps into "quelqun," while a combination-type correspondence relates "dirty" to "sale." For combination correspondences, any extension of MWE1 which affects a combination node introduces a coordination relation in the representation of MWE2. This concept is illustrated in FIG. 17-B. The word "unexpected" ("inattendu" in French) is an extension of the MWE "to play a dirty trick on someone," and connects to the node "a trick" by the same type of relation link r1 as the word "dirty." A linguistic system may automatically translate a new MWE "to play an unexpected dirty trick on someone" in the following manner: since "a trick" is mapped into "un tour," and "dirty" is in combination correspondence with "sale," attach the new node "inattendu" to the dependency tree of the original MWE "jouer un sale tour à quelqun" at an equivalent position, while introducing a coordination relation (in this case coordination via "et") between "sale" and "inattendu."

It will be clear to one skilled in the art that the above embodiments may be altered in many ways without departing from the scope of the invention. For example, a lexical correspondence code generator may generate code represented in GAL, XML, and/or other forms. Similarly, a linguistic knowledge base may maintain its entries in GAL, XML, and/or other forms. Accordingly, the scope of the invention should be determined by the following claims and their legal equivalents.

What is claimed is:

1. A system comprising:
   a lexical correspondence graphical user interface configured to
   co-display to a user a first dependency tree of a first multi-word expression in a first natural language and a second dependency tree of a corresponding second multi-word expression in a second natural language, and
   in response to co-displaying the first and second dependency trees to the user, receive a user input indicating a presence and a type of a lexical correspondence between a first node of the first dependency tree and a second node of the second dependency tree, the user input comprising an indicator of a user selection from a plurality of lexical correspondence type choices presented to the user of the type of the lexical correspondence between the first node of the first dependency tree and the second node of the second dependency tree; and
   a lexical correspondence code generator connected to the lexical correspondence graphical user interface and configured to generate grammar abstract language (GAL) computer-readable correspondence code representing the lexical correspondence in response to receiving an indicator of the user input, the grammar abstract language correspondence code designating a set of correspondences between nodes of a grammar abstract language dependency tree representing the first multi-word expression and corresponding nodes of a grammar abstract language dependency tree representing the second multi-word expression, wherein a node of the grammar abstract language representation of the first multi-word expression includes an attribute-value tree characterizing morphologically the node;
   wherein at least one node of the first dependency tree is a procedural node representing a procedure, wherein performing the procedure comprises executing code to perform an action selected from turning numerals into numeric values, manipulating a picture embedded in text, and manipulating a sound embedded in text associated with the node.

2. The system of claim 1, wherein the plurality of lexical correspondence type choices presented to the user includes a mapping type, a transfer type and a combination type.

3. The system of claim 2, wherein a mapping correspondence between the first node and the second node indicates that the first node and the second node are equivalent terminal nodes for which extensions of the first node in the first dependency tree are to be mirrored into extensions of the second node in the second dependency tree.

4. The system of claim 2, wherein a transfer correspondence between the first node and the second node indicates that the first node and the second node are non-equivalent terminal nodes for which extensions of the first node in the first dependency tree are to be mirrored into extensions of the second node in the second dependency tree.

5. The system of claim 1, further comprising a lexical correspondence knowledge base configured to receive and store the XML code representing the lexical correspondence.

6. The system of claim 1, wherein the lexical correspondence graphical user interface is configured to display to the user a graphical connection between the first linguistic node and the second linguistic node in response to receiving the user input.

7. The system of claim 1, wherein a linguistic node of the first dependency tree represents an individual word.

8. The system of claim 1, further comprising a lexical element manager connected to the lexical correspondence graphical user interface, and configured to receive the first multiword expression and the second multi-word expression in natural language form and to generate structured computer-readable grammar abstract language lexicon entries for the first multiword expression and the second multiword expression.

9. The system of claim 1, wherein nodes of the grammar abstract language dependency tree representing the first multi-word expression include variability designations including invariable, partially variable, and totally variable.

10. The system of claim 1, wherein the lexical correspondence manager is further configured to link an extension of the second node according to the received indicator of the user selection of the type of the lexical correspondence between the first node and the second node.

11. The system of claim 1, further comprising a linguistic GAL-to-XML compiler configured to input the grammar abstract language computer-readable correspondence code representing the lexical correspondence and output extensible markup language (XML) code representing the lexical correspondence.

12. A computer-implemented method comprising:
co-displaying to a user a first dependency tree of a first multi-word expression in a first natural language and a second dependency tree of a second multi-word expression in a second natural language;
in response to co-displaying the first dependency tree and the second dependency tree to the user, receiving a user input indicating a presence and a type of a lexical correspondence between a first linguistic node of the first dependency tree and a second linguistic node of the second dependency tree, the user input comprising an indicator of a user selection from a plurality of lexical correspondence type choices presented to the user of the type of the lexical correspondence between the first node of the first dependency tree and the second node of the second dependency tree;
and
in response to receiving the user input, generating grammar abstract language (GAL) computer-readable correspondence code representing the lexical correspondence, the grammar abstract language correspondence code designating a set of correspondences between nodes of a grammar abstract language dependency tree representing the first multi-word expression and corresponding nodes of a grammar abstract language dependency tree representing the second multi-word expression, wherein a node of the grammar abstract language representation of the first multi-word expression includes an attribute-value tree characterizing morphologically the node;
wherein at least one node of the first dependency tree is a procedural node representing a procedure, wherein performing the procedure comprises executing code to perform an action selected from turning numerals into numeric values, manipulating a picture embedded in text, and manipulating a sound embedded in text associated with the node.

13. The method of claim 12, wherein the plurality of lexical correspondence type choices presented to the user includes a mapping type, a transfer type and a combination type.

14. The method of claim 13, wherein a mapping correspondence between the first node and the second node indicates that the first node and the second node are equivalent terminal nodes for which extensions of the first node in the first dependency tree are to be mirrored into extensions of the second node in the second dependency tree.

15. The method of claim 13, wherein a transfer correspondence between the first node and the second node indicates that the first node and the second node are non-equivalent terminal nodes for which extensions of the first node in the first dependency tree are to be mirrored into extensions of the second node in the second dependency tree.

16. The method of claim 12, further comprising displaying to the user a graphical connection between the first linguistic node and the second linguistic node in response to receiving the user input.

17. The method of claim 12, wherein a linguistic node of the first dependency tree represents an individual word.

18. The method of claim 12, further comprising receiving the first multiword expression and the second multiword expression in text form and generating computer-readable grammar abstract language lexicon entries for the first multiword expression and the second multiword expression.

19. The method of claim 12, further comprising linking an extension of the second node according to the received indicator of the user selection of the type of the lexical correspondence between the first node and the second node.

20. The method of claim 12, further comprising compiling the grammar abstract language computer-readable correspondence code into extensible markup language (XML) code representing the lexical correspondence.

21. A system comprising:
means for co-displaying to a user a first dependency tree of a first multi-word expression and a second dependency tree of a second multi-word expression;
means for receiving a user input indicating a presence and a type of a lexical correspondence between a first linguistic node of the first dependency tree and a second linguistic node of the second dependency tree in response to co-displaying the first dependency tree and the second dependency tree to the user, the user input comprising an indicator of a user selection from a plurality of lexical correspondence type choices presented to the user of the type of the lexical correspondence between the first node of the first dependency tree and the second node of the second dependency tree; and means for generating grammar abstract language computer-readable correspondence code representing the lexical correspondence in response to receiving the user input, the grammar abstract language correspondence code designating a set of correspondences between nodes of a grammar abstract language dependency tree representing the first multi-word expression and corresponding nodes of a grammar abstract language dependency tree representing the second multi-word expression, wherein a node of the grammar abstract language representation of the first multi-word expression includes an attribute-value tree characterizing morphologically the node;

wherein at least one node of the first dependency tree is a procedural node representing a procedure, wherein performing the procedure comprises executing code to perform an action selected from turning numerals into numeric values, manipulating a picture embedded in text, and manipulating a sound embedded in text associated with the mode.

22. A system comprising:

a lexicon linguistic knowledge base configured to store a plurality of lexicon entries for each of a plurality of natural languages;

a lexical element manager connected to the lexicon linguistic knowledge base, and configured to receive natural language multi-word expressions and generate a structured lexicon entry for each natural language multi-word expression for storage in the lexicon linguistic knowledge base;

a lexical correspondence knowledge base storing a plurality of multi-word expression correspondence entries between at least a pair of natural languages of the plurality of natural languages;

a graphical user interface configured to co-display to a user a first dependency tree of a first multi-word expression in a first natural language and a second dependency tree of a corresponding second multi-word expression in a second natural language, and in response to co-displaying the first and second dependency trees to the user, receive user input indicating a presence and a type of a lexical correspondence between a first node of the first dependency tree and a second node of the second dependency tree, the user input comprising an indicator of a user selection from a plurality of lexical correspondence type choices presented to the user of the type of the lexical correspondence between the first node of the first dependency tree and the second node of the second dependency tree; and a lexical correspondence manager connected to the lexicon linguistic knowledge base, graphical user interface and the lexical correspondence knowledge base, and configured to generate grammar abstract language (GAL) multi-word expression correspondence code according to lexicon entries stored in the lexicon linguistic knowledge base and multi-word expression correspondence user input, for updating the lexical correspondence knowledge database, the grammar abstract language correspondence code designating a set of correspondences between nodes of a grammar abstract language dependency tree representing the first multi-word expression and corresponding nodes of a grammar abstract language dependency tree representing the second multi-word expression, wherein a node of the grammar abstract language representation of the first multi-word expression includes an attribute-value tree characterizing morphologically the node;

wherein at least one node of the first dependency tree is a procedural node representing a procedure, wherein performing the procedure comprises executing code to perform an action selected from turning numerals into numeric values, manipulating a picture embedded in text, and manipulating a sound embedded in text associated with the node.

* * * * *

UNITED STATES PATENT AND TRADEMARK OFFICE
CERTIFICATE OF CORRECTION

PATENT NO. : 8,706,477 B1
APPLICATION NO. : 12/109885
DATED : April 22, 2014
INVENTOR(S) : Diaconescu et al.

Page 1 of 1

It is certified that error appears in the above-identified patent and that said Letters Patent is hereby corrected as shown below:

On the Title Page, Item (54) and in the Specification at Column 1, line 6, in the title, after the word Denoting, replace "Execute" with -- Executable --

Signed and Sealed this
Fifteenth Day of July, 2014

Michelle K. Lee
*Deputy Director of the United States Patent and Trademark Office*